(12) United States Patent
Anastasiadis et al.

(10) Patent No.: US 7,103,595 B2
(45) Date of Patent: Sep. 5, 2006

(54) STREAMING SERVER

(76) Inventors: Stergios V. Anastasiadis, 3611 University Dr. Apt. 3Y, Durham, NC (US) 27707; Kenneth C. Sevcik, 99 Harbour Square, Suite 4001, Toronto, Ontario (CA), M5J 2H2; Michael Stumm, 3 Belvale, Toronto (CA), H5X 2A6

( * ) Notice: Subject to any disclaimer, the term of this patent is extended or adjusted under 35 U.S.C. 154(b) by 1049 days.

(21) Appl. No.: 10/054,699

(22) Filed: Jan. 22, 2002

(65) Prior Publication Data

US 2003/0074486 A1 Apr. 17, 2003

(30) Foreign Application Priority Data

| Jan. 19, 2001 | (CA) | 2331474 |
| Feb. 9, 2001 | (CA) | 2335521 |
| Feb. 9, 2001 | (CA) | 2335540 |

(51) Int. Cl.
*G06F 17/30* (2006.01)

(52) U.S. Cl. .............................. 707/7; 707/1

(58) Field of Classification Search ............... 707/1, 707/2, 7, 10, 104.1; 709/203, 219, 221, 226, 709/231; 711/114; 714/4, 5, 11; 719/321
See application file for complete search history.

(56) References Cited

U.S. PATENT DOCUMENTS

| 5,974,503 A | * | 10/1999 | Venkatesh et al. | 711/114 |
| 6,230,200 B1 | * | 5/2001 | Forecast et al. | 709/226 |
| 6,625,750 B1 | * | 9/2003 | Duso et al. | 714/11 |

OTHER PUBLICATIONS

Ken Rudin, Scalable Systems Architecture: Scalable I/O, Part I: Disk Striping, published in DM Review in May 1998, pp. 1–3.*

Shenoy and Vin, Failure Recovery Algorithms for Multimedia Servers, University of Texas at Austin, pp. 1–34 (undated).

Haskin and Schmuck, The Tiger Shark File System, IBM Almaden Research Center, IEEE, 1996, pp. 226–231.

Bolosky, et al., Distributed Schedule Management in the Tiger Video Fileserver, Microsoft Research, SOSP 97 (undated).

Anastasiadis, et al., Modular and Efficient Resource Management in the Exedra Media Server, University of Toronto, USfNIX Symp. On Internet Tech., San Francisco, CA Mar. 2001.

Shenoy and Vin, Efficient Striping Techniques for Multimedia File Servers, University of Texas at Austin, NOSSDAV 97, pp. 25–36 (undated).

Reddy and Wijayaratne, Techniques for improving the throughput of VBR streams, Texas A & M University, NCN 99 (undated).

Gafsi and Biersack, Data Striping and Reliability Aspects in Distributed Video Servers, Institut EURECOM, In Cluster Computing, Balzer Pub. (1998), pp. 1–27.

Özden, et al., Disk Striping in Video Server Environments, AT&T Bell Laboratories, IEEE, 1996, pp. 580–589.

(Continued)

*Primary Examiner*—Apu Mofiz
(74) *Attorney, Agent, or Firm*—Connolly Bove Lodge & Hutz LLP

(57) ABSTRACT

A media server having at least one of a stride-based storage device space allocation scheme, stride-based method of striping data across multiple storage devices for continuous media streaming, server-based smoothing of variable bit-rate streams, distributed architecture, and fault tolerance.

18 Claims, 20 Drawing Sheets

OTHER PUBLICATIONS

Carbrera and Long, Swift: Using Distributed Disk Striping to Provide High I/O Data Rates, Computing Systems 4(4) (Fall 1991), pp. 405-436.

Anastasiadis, et al., Server-Based Smoothing of Variable Bit-Rate Streams, ACM Int'l Symp. On Multimedia, Oct. 2001 (Ottawa, ON Canada).

Anastasiadis, et al., Maximizing Throughput in Replicated Disk Striping of Variable Bit-Rate Streams, USfNIX Annual Tech. Conf., Monterey, CA (Jun. 2002).

Anastasiadis, et al., Disk Striping Scalability in the Exedra Media Server, University of Toronto, SPIE/ACM Multimedia Computing and Networking Conf., San Jose, CA (Jan. 2001).

McManus and Ross, A Dynamic Programming Methodology for Managing Prerecorded VBR Sources in Packet-Switched Networks, University of Pennsylvania, Jan. 1997, pp. 1-28.

Zhao and Tripathi, Banwidth-Efficient Continuous Media Streaming Through Optimal Multiplexing (undated).

Sen, et al., Proxy Prefix Caching for Multimedia Streams, IEEE, 1999, pp. 1310-1319.

Sahu, et al., On the Efficient Retrieval of VBR Video in a Multimedia Server, IEEE, 1997, pp. 46-53.

Biersack and Hamdi, Cost-optimal Data Retrieval for Video Servers with Variable Bit Rate Video Streams, NOSSDAV 98 (Cambridge, UK) (undated).

Salehi, et al., Supporting Stored Video: Reducing Rate Variability and End-to-End Resource Requirements through Optimal Smoothing, University of Massachusetts, SIGMETRICS 96, 1996, pp. 222-231.

Shenoy, et al., Symphony: An Integrated Multimedia File System, University of Texas, pp. 1-17, Tech. Report TR 97-09 (Mar. 1997).

Sen, et al., Online Smoothing of Variable-Bit-Rate Streaming Video, IEEE Transactions on Multimedia, v. 2, No. 1 (Mar. 2000).

Makaroff, et al., An Evaluation of VBR Disk Admission Algorithms for Continuous Media File Servers, ACM Multimedia (1997) pp. 145-154.

Santos and Muntz, Performance Analysis of the RIO Multimedia Storage System with Heterogeneous Disk Configurations, ACM Multimedia, 1998, pp. 1-6 and 227-238 (1998).

Gringeri, et al., Traffic Shaping, Bandwidth Allocation, and Quality Assessment for MPEG Video Distribution over Broadband Networks, IEEE Network, (Dec. 1998).

Lakshman, et al., VBR Video: Tradeoffs and Potentials, Proceedings of the IEEE, vol. 86, No. 5, May 1998, pp. 952-973.

Martin, et al., The Fellini Multimedia Storage System, Information Sciences Research Center, Journal of Digital Libraries, pp. 1-22 (1997).

Flynn and Tetzlaff, Disk Striping and Block Replication Algorithms for Video File Servers, Proceedings of Multimedia, IEEE, 1996, pp. 590-597.

Tewari, et al., High Availability in Clustered Multimedia Servers, Int'l Conf. on Data Engineering (Feb. 1996) pp. 336-342.

Ozden, et al., Fault-tolerant Architectures for Continuous Media Servers, ACM SIGMOD (Jun. 1996).

Tobagi, et al., Streaming RAID—A Disk Array Management System For Video Files, ACM Multimedia, 1993, pp. 393-400.

Mourad, Doubly-Striped Disk Mirroring: Reliable Storage for Video Servers, Multimedia Tools and Applications 2, 1996, pp. 273-297.

Berson, et al., Fault Tolerant Design of Multimedia Servers, ACM, 1995, pp. 364-375.

Gray and Shenoy, Rules of Thumb in Data Engineering, IEEE International Conference on Data Engineering, 2000.

Bolosky, et al., The Tiger Video Fileserver, NOSSDAV, (Apr. 1996).

Patterson, et al., A Case for Redundant Arrays of Inexpensive Disks (RAID), University of California (undated).

McVoy and Kleiman, Extent-like Performance from a UNIX File System, USENIX, Dallas, TX (Winter 1991), pp. 1-12.

* cited by examiner

STREAMING SERVER

CROSS-REFERENCE TO RELATED APPLICATION(S)

This application is related to and claims priority to Canadian patent application entitled STRIDE-BASED DISK SPACE ALLOCATION SCHEME having serial number 2,331,474, by Stergios V. Anastasiadis, filed Jan. 19, 2001; to Canadian patent application entitled DISTRIBUTED MEDIA SERVER ARCHITECTURE having serial number 2,335,521, by Stergios V. Anastasiadis, filed Feb. 9, 2001; and to Canadian patent application entitled SERVER BASED SMOOTHING OF VARIABLE BIT RATE STREAMS having serial number 2,335,540, by Stergios V. Anastasiadis, filed Feb. 9, 2001.

The entire teachings of the above Canadian patent applications are further incorporated herein by reference.

OTHER REFERENCES

Stergios V. Anastasiadis, Supporting Variable Bit-Rate Streams in a Scalable Continuous Media Server, PhD Dissertation, University of Toronto, public on January 2002.

Stergios V. Anastasiadis, Kenneth C. Sevcik, Michael Stumm, Disk Striping Scalability in the Exedra Media Server, SPIE/ACM Multimedia Computing and Network Conference, San Jose, Calif., January 2001 at 175.

Stergios V. Anastasiadis, Kenneth C. Sevcik, Michael Stumm, Modular and Efficient Resource Management in the Exedra Media Server, Usenix Symposium on Internet Technologies and Systems, San Francisco, Calif., March 2001 at 25.

Stergios V. Anastasiadis, Kenneth C. Sevcik, Michael Stumm, Server-Based Smoothing of Variable Bit-Rate Streams, ACM Multimedia Conference, Ottawa, ON, October 2001 at 147.

The entire teachings of the above references are further incorporated herein by reference.

FIELD OF INVENTION

This invention relates to network servers and, in particular, a streaming server that supports variable bit-rate streams and has at least one of a stride-based storage device space allocation scheme, stride-based method of striping data across multiple storage devices, distributed architecture, fault tolerant operation, and server-based smoothing.

BACKGROUND OF THE INVENTION

Spatial and temporal compression have made practical the storage and transfer of digital video streams with acceptable quality. Standardization (for example, through the MPEG specifications) has facilitated widespread distribution and use of compressed video content in a range of applications from studio post-production editing to home entertainment (e.g. Digital Versatile Disks). Although media streams can optionally be encoded at a constant bit rate, it has been shown that equally acceptable quality can be achieved using variable bit-rate encoding with average bit rates reduced by 40%.

As the installed network bandwidth increases, scalable network servers are becoming the dominating bottleneck in the wide deployment of broadband services. Therefore, the potential scalability of network servers that support variable bit-rate media streams is becoming a fundamental problem.

System design complications coupled with excessive expectations from technological progress previously discouraged the development of media servers efficiently supporting video streams with variable bit rates. Several media server designs either i) support only constant bit-rate streams, ii) make resource reservations assuming a fixed bit rate for each stream, or iii) have only been demonstrated to work with constant bit rate streams.

It is therefore an aspect of an object of the present invention for providing a distributed continuous-media server architecture, called Exedra, that efficiently supports variable bit-rate streams and reduces the requirements for storage device space, storage device bandwidth, buffer space, and network bandwidth with respect to servers that support only constant bit-rate streams.

Vast storage and bandwidth capacity requirements of even compressed video streams make it necessary to stripe video files across multiple storage devices. Assuming that a media storage server serves requests for several different stream files, appropriate striping makes it possible to scale the number of supported streams to the limit of the server resources, independent of the particular stream file being requested by clients. This is possible by retrieving different parts of each stream file from different storage devices, thus restricting the degree of imbalance in utilization among the storage devices.

However, it has been previously shown that both load imbalance across disks and disk overhead is causing disk striping of variable bit-rate streams to be efficient only on disk arrays of limited size. Therefore, the scalability of network servers that stripe variable bit-rate streams across multiple storage devices is a fundamental problem.

It is an aspect of an object of the present invention for providing a new storage device space allocation technique and striping policies for variable bit-rate streams that increase system throughput and improve scalability.

The Internet and online services introduce increasing requirements for quality-of-service guarantees in order to ensure that a failure does not result in denial of service for clients. Hard drives or storage devices continue to be a major source of failure. This is not surprising since disks are essentially the only moving mechanical parts of computers.

It is therefore an aspect of an object of the present invention for providing fault tolerance in storage device arrays and clusters of computer nodes that support variable bit-rate streams.

Variable bit-rate encoding of video streams can achieve quality equivalent to constant bit-rate encoding while requiring average bit rate that is lower by 40%. However, variable bit-rate streams have high variability in their resource requirements, which can lead to low utilization of storage device and network bandwidth in the common case. This occurs because the aggregate bandwidth requirements of concurrently served streams can be significantly higher than on average at particular time instances, and the admission control process bases its decisions on peak aggregate demand when considering new stream requests.

In order to improve resource utilization and the throughput of the system, a number of smoothing techniques have been proposed that can remove peaks in the required transfer bandwidth of individual streams by appropriately prefetching stream data at times of lower bandwidth demand. To date smoothing schemes always prefetched data into the client buffers. Although such an approach can improve the utilization of both storage device and network bandwidth, it is dependent on the amount of buffer space available at the client. However, emergence of client devices with widely different hardware configurations make it necessary to reconsider such assumptions.

It is therefore an aspect of an object of the present invention a smoothing method that uses buffer space available in the server and provides efficient striping of variable bit-rate streams across either homogeneous or heterogeneous storage devices.

SUMMARY OF THE INVENTION

According to an aspect of the invention, there is provided a method and system for accessing variable bit-rate streams from one or a multitude of secondary storage devices. The system provides that data for each stream are retrieved according to a prespecified rate that may vary over time. The space of each storage device is managed as a collection of fixed-size chunks with length larger than a given minimum. The data transfers occur in periods (or rounds) of fixed duration. The data of each stream is distributed across a multitude of storage devices in a way that only one storage device is accessed for a stream during one or a multitude of rounds. Detailed accounting is done for the access time of the storage devices, the transmission time of the network transfer devices, and the available memory space in the system for each round. The space of each storage device is managed independently from that of the others. The available memory is allocated contiguously in the virtual space for each access of a storage device, and can be deallocated in units smaller than the length of the original allocation. When storage devices fail, data redundancy and extra reserved device channel bandwidth guarantee uninterrupted system operation.

According to a further aspect of the invention, there is provided a server-based smoothing method that uses only buffer space available at the server for smoothing storage device data transfers. The smoothing method is also extended to support striping of variable bit-rate streams across heterogeneous storage devices. The present invention maximizes the average number of users supported concurrently in continuous-media server systems by applying smoothing techniques and combining them appropriately with storage device striping and admission control policies. In order to prevent excessive smoothing from exhausting the available buffer space, data prefetching is done as long as the proportion of server buffer required by each stream does not exceed the corresponding proportion of the required storage device bandwidth. Thus, the smoothing process is adjusted automatically, according to the total memory and storage device bandwidth available in the server.

BRIEF DESCRIPTION OF THE DRAWINGS

The present invention will be described in detail with reference to the accompanying drawings, in which like numerals denote like parts, and in which.

DETAILED DESCRIPTION

Figure 1:
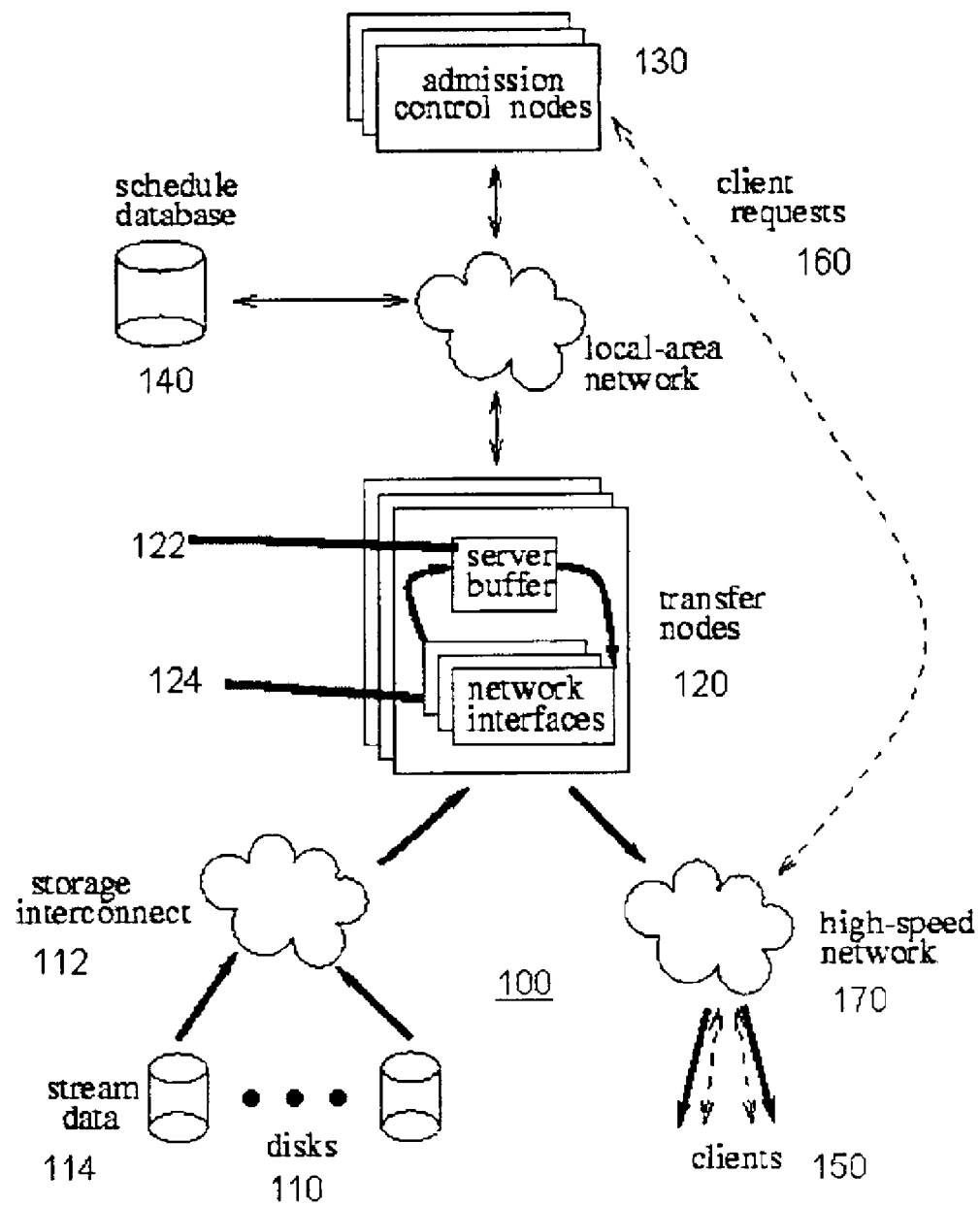
FIG. 1 is a block diagram of a distributed streaming server in accordance with an embodiment of the present invention.

Referring to the drawings and initially to FIG. 1, there is illustrated a block diagram of a distributed streaming server 100 in accordance with an embodiment of the present invention. The distributed streaming server 100 comprises storage devices 110 for storing media stream data 114, transfer nodes 120, admission control nodes 130, and a schedule database 140 containing scheduling information. The media stream data 114 are compressed, such as, according to the MPEG-2 specification, with constant quality quantization parameters and variable bit rates. Clients 150 with appropriate stream decoding capability send client/playback requests 160 and receive stream data 114 via a high-speed network 170. Alternate compression schemes as is known in the art may also be used.

In the streaming server 100, the stream data 114 are retrieved from the storage devices 110 and sent to the clients 150 through the Transfer Nodes 120. Both the admission control nodes 130 and the transfer nodes 120 use of stream scheduling information maintained in the Schedule Database 140.

The streaming server 100 is operated using the server-push model, but other models are possible. When a playback session starts for a client 150, the server 100 periodically sends data to the client 150 until either the end of the stream is reached, or the client 150 explicitly requests suspension of the playback. The server-push model reduces the control traffic from the client to the server and facilitates resource reservation at the server side, when compared to a client-pull model. The data transfers occur in rounds of fixed duration $T_{round}$: in each round, an appropriate amount of data is retrieved from the storage devices 110 into a set of server buffers 122 reserved for each active client 150. Concurrently, data are sent from the server buffers 122 to the client 150 through network interfaces 124. Round-based operation is used in media servers in order to keep the reservation of the resources and the scheduling-related bookkeeping of the data transfers manageable.

Due to the large amount of network bandwidth required for this kind of service, preferably the server 100 is connected to a high-speed network 170 through a multitude of network interfaces 124. The amount of stream data periodically sent to the clients 150 are determined by the decoding frame rate of the stream and the resource management policy of the server 100. A policy is to send to the client during each round the amount of data that will be needed for the decoding process of the next round; any other policy that does not violate the timing requirements and buffering constraints of the decoding client is also acceptable.

The stream data are stored across multiple storage devices 110, such as hard drives or disks, as shown in FIG. 1. Every storage device 110 is connected to a particular Transfer Node 120, through a Storage Interconnect 112, which is either i) a standard I/O channel (for example, Small Computer System Interface), ii) standard network storage equipment (for example, Fibre-Channel), or iii) a general purpose network (as with Network-Attached Secure Disks). Alternately, part of the server functionality can be offloaded to network-attached storage devices.

The Transfer Nodes 120 are computers responsible for scheduling and initiating all data accesses from the attached storage devices 110. Data arriving from the storage devices 110 are temporarily staged in the Server Buffer memory 122 of the Transfer Node 120 before being sent to the client 150 through the high-speed network 170. The bandwidth of the system bus (such as the Peripheral Component Interconnect) is the critical resource within each Transfer Node 120 that essentially defines the number and the capacity of the attached network or I/O channel interfaces.

Playback requests 160 arriving from the clients 150 are initially directed to an Admission Control Node 130, where it is determined whether enough resources exist to activate the requested playback session either immediately or within a few rounds. If a new playback request is accepted, commands are sent to the Transfer Nodes 120 to begin the appropriate data accesses and transfers. The computational complexity of the general stream scheduling problem is combinatorial in the number of streams considered for activation and the number of reserved resources. As the acceptable initiation latency is limited, a simple scheduling approach with complexity linear with the number of rounds of each stream and the number of reserved resources, is used. The admission control nodes are distributed across multiple processors as shown in FIG. 1, and concurrency control issues that potentially arise are also taken into account.

The Schedule Database 140 maintains information on the amount of data that needs to be retrieved during each round for each stream and on which storage devices this data is stored. It also specifies the amount of buffer space required and the amount of data sent to the client by the Transfer Nodes 120 during each round. The scheduling information is generated before the media stream is first stored and is used for both admission control and for controlling data transfers during playback. Since this information changes infrequently, it is replicated to avoid potential bottlenecks.

Figure 2:
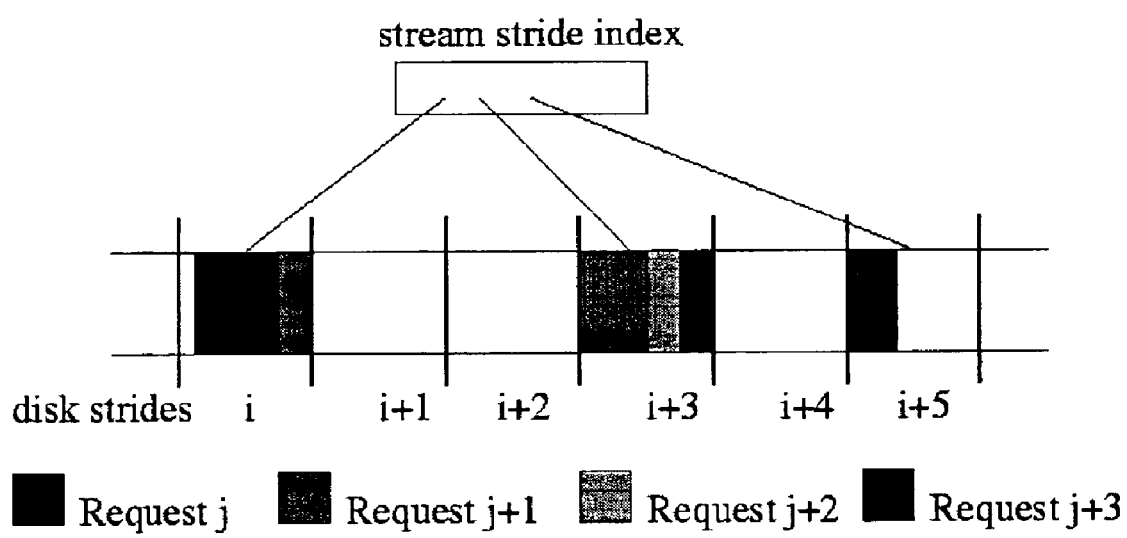
FIG. 2 is a logical representation of a stride-based allocation of disk space on one disk of FIG. 1.

Referring to FIG. 2, there is illustrated a logical representation of a stride-based allocation of storage device space on one storage device of FIG. 1. In stride-based allocation, storage device space is allocated in large, fixed-sized chunks (i, i+1, i+2, i+3, i+4, i+5) called strides 200, which are chosen larger than the maximum stream request size per storage device during a round. The stored streams are accessed sequentially according to a predefined (albeit variable) rate; therefore, the maximum amount of data accessed from a storage device during a round for a stream is known a priori. Stride-based allocation eliminates external fragmentation, while internal fragmentation remains negligible because of the large size of the streams, and because a stride may contain data of more than one round as shown in stride i+3 of FIG. 2. The contents of each stride are tracked in a stream stride index 210.

When a stream is retrieved, only the requested amount of data (one of Requests j, j+1, j+2, or j+3), and not the entire stride 200, necessary for each round is fetched to memory at a time. Since the size of a stream request per round never exceeds the stride size, at most two partial stride accesses (two seek and rotation delays) are required to serve the request of a round on each storage device. Thus, the stride-based allocation scheme sets an upper-bound on the estimated storage device access overhead during retrieval. This avoids an arbitrary number of actuator movements required by prior allocation methods. This also keeps storage device access head movements to a minimum. For example, while i+3 stride 200 contains parts of Request j+1 and Request j+2, and Request j+3, there is no Request that is stored over more than two strides 200.

While storing the data of each storage device request contiguously, on a disk for example, would reduce the storage device overhead to a single seek and rotation delay (instead of two at most), the overhead for storage management (bookkeeping) of large highly utilized storage devices could become significant. An advantage of the present invention is the reduction of overhead for storage management.

In the sequence definitions that follow, a zero value is assumed outside the specified range.

In the server 100 with D functionally equivalent storage devices, the stream Network Sequence, Sn, of length Ln defines the amount of data, Sn[i], 1=<i=<Ln, that the server 100 sends to a particular client 150 during round i after its playback starts. Similarly, the Buffer Sequence Sb of length Lb=Ln+1 defines the server buffer 122 space, Sb(i), =<i=<Lb, occupied by the stream data during round i. The Storage Device Sequence Sd of length Ld=Ln defines the total amount of data Sd(i), =<i=<Ld−1, retrieved from all the storage devices 110 in round i for the client.

The data are stored on the storage devices 110 in strides 200. The stride size Bs is a multiple of the logical block size Bl, which is a multiple of the physical sector size Bp of the storage device. Both storage device transfer requests and memory buffer reservations are specified in multiples of the logical block size Bl. After taking into account logical block quantization issues, the storage sequence Sd can be derived from the network sequence Sn as follows: If $$K^d(i) = \left\lceil \frac{\sum_{0 \leq j \leq i} S_n(j+1)}{B_l} \right\rceil$$

specifies the cumulative number of blocks Bl retrieved through round i, then $$S_d(i) = (K^d(i) - K^d(i-1)) \cdot B_l.$$

The Storage Device Striping Sequence Smd of length Ld determines the amount of data Smd(i,k), 0=<i=<Ld−1, that are retrieved from the storage device 110k, 0=<k=<D−1, in round i. It is generated from the Storage Device Sequence Sd, according to the striping policy used.

Each storage device 110 has edge to edge seek time TfullSeek, single track seek time TtrackSeek, average rotation latency TavgRot, and minimum internal transmission rate Rdisk. The stride-based storage device space allocation policy enforces an upper bound of at most two storage device arm movements per storage device for each client per round. The total seek distance is also limited using a CSCAN storage device scheduling policy. Let Mi be the number of active streams during round i of system operation. Where the playback of stream j, 1=<j=<Mi, is initiated at round lj of system operation, then, the total access time on storage device k in round i of the system operation has an upper-bound of:

$$T_{disk}(i,k) = 2T_{fullSeek} + 2M_i \cdot (T_{trackSeek} + T_{avgRot}) + \sum_{j=1}^{M_i} S_{md}^j(i-l_j,k)/R_{disk}$$

where Smd^j is the storage device striping sequence of client j. TfullSeek is counted twice due to the storage device arm movement from the CSCAN policy, while the factor two of the second term is due to the stride-based method. The first term should be accounted for only once in the storage device time reservation structure of each storage device. Then, each client j 150 incurs an additional maximum access time of $$T_{disk}^{j}(i,k)=2\cdot(T_{trackSeek}+T_{avgRot})+S_{md}^{j}(i-l_j,k)/R_{disk}$$

on storage device k during round i, when Smd^j(i−lj,k)>0, and zero otherwise.

If Rnet is the total high-speed network bandwidth available to the server 100, then the corresponding network transmission time reserved for client j 150 in round i becomes T^jnet(i)=Sn^j(i−lj)/Rnet, where Sn is the Network Sequence of client j 150. The total server memory buffer reserved for client j 150 in round i becomes B^j(i)=Sb^j(i−lj), where Sb is the Buffer Sequence of client j 150. Although, the above expressions for T^jnet(i) and B^j(i) are sufficient for the needs of the present embodiments, accounting for available network bandwidth and buffer memory within each individual Transfer Node may require them to be split into appropriate sub-expressions.

The reservations of transfer time on each network interface 124 and buffer space 122 on each transfer node 120 are more straightforward, and are based on the Network Striping Sequence and Buffer Striping Sequence, respectively.

In traditional storage systems, data access patterns are relatively hard to predict, making it difficult to determine optimal storage device striping parameters. However, with read-only sequential access being the common case for video/media streaming, it is possible to predict to some degree the expected system load requirements during retrieval, making it possible to determine appropriate storage device striping parameters a priori for the storage and retrieval of the data. The present invention includes exploiting this characteristic of stored video/media streams.

Figure 3:
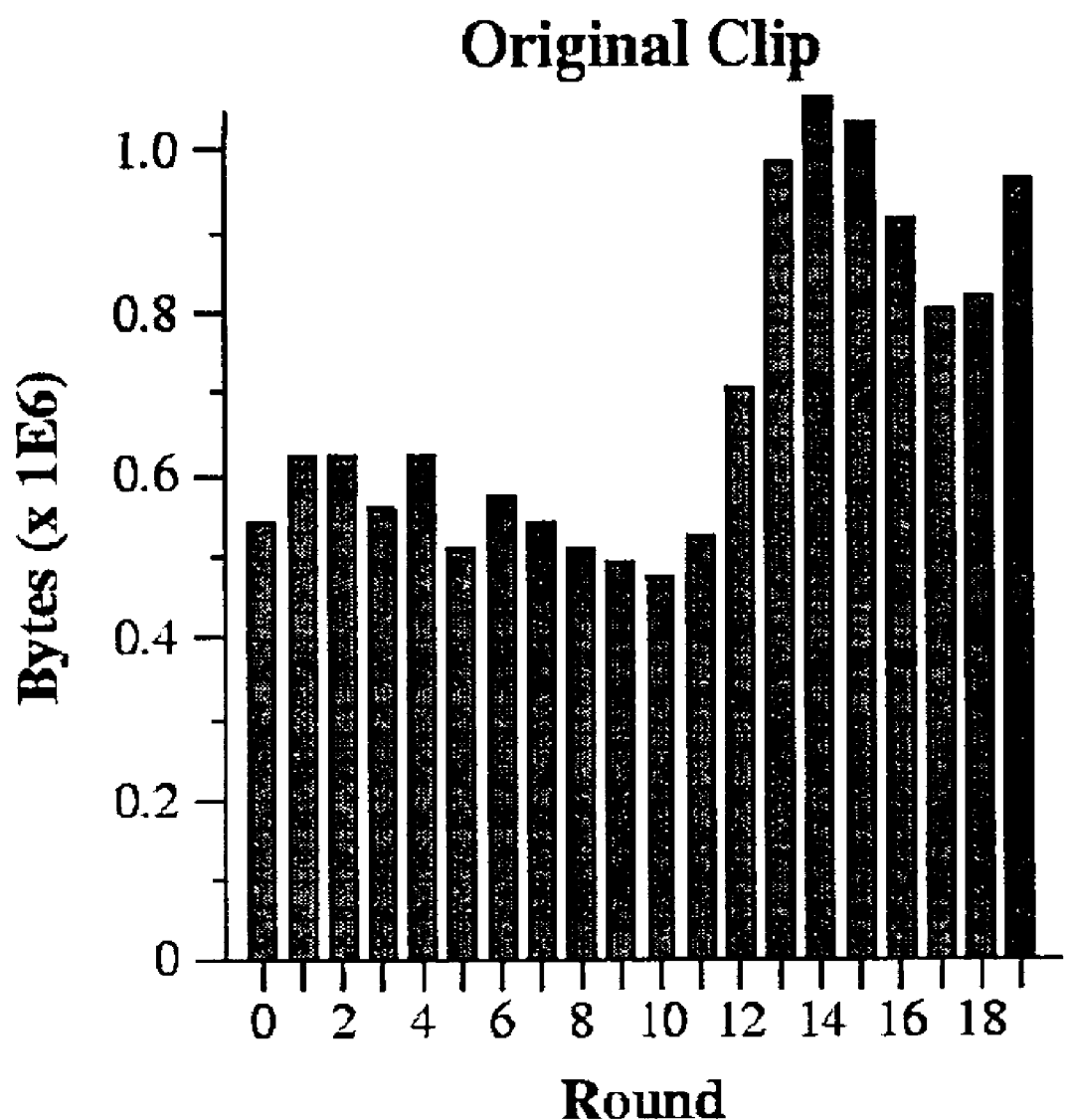
FIG. 3 is a graph of data requirements of twenty consecutive rounds one second each, in an MPEG-2 clip.
Figure 4A:
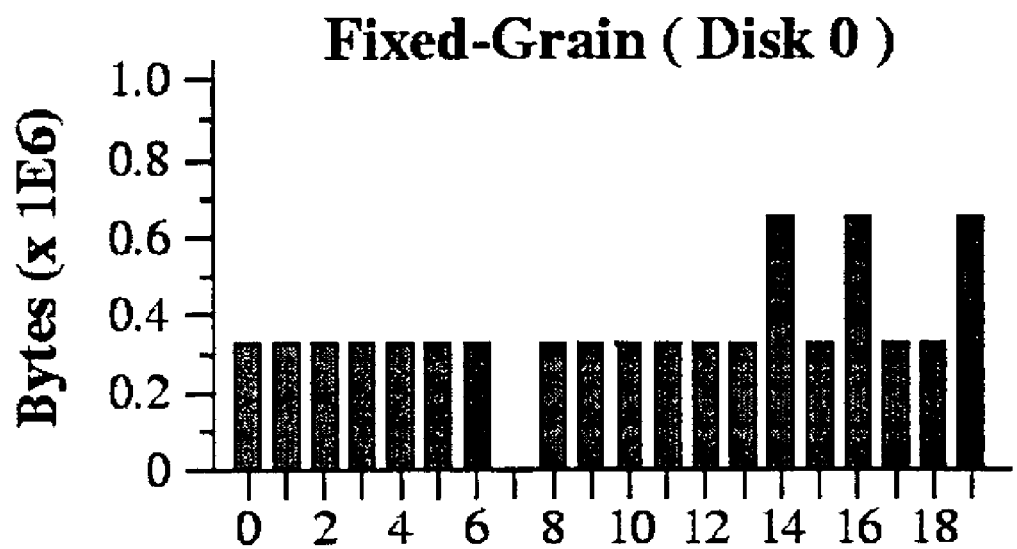
FIGS. 4(a) to (c) are graphs of data accesses for the clip of FIG. 3 using alternative striping techniques over two disks.
Figure 4A:
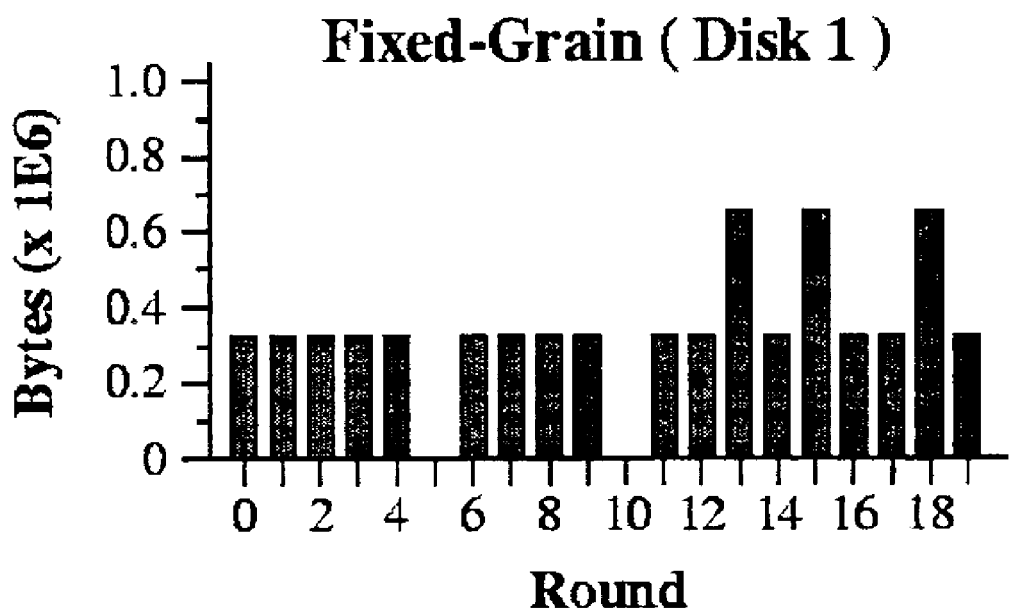
Figure 4B:
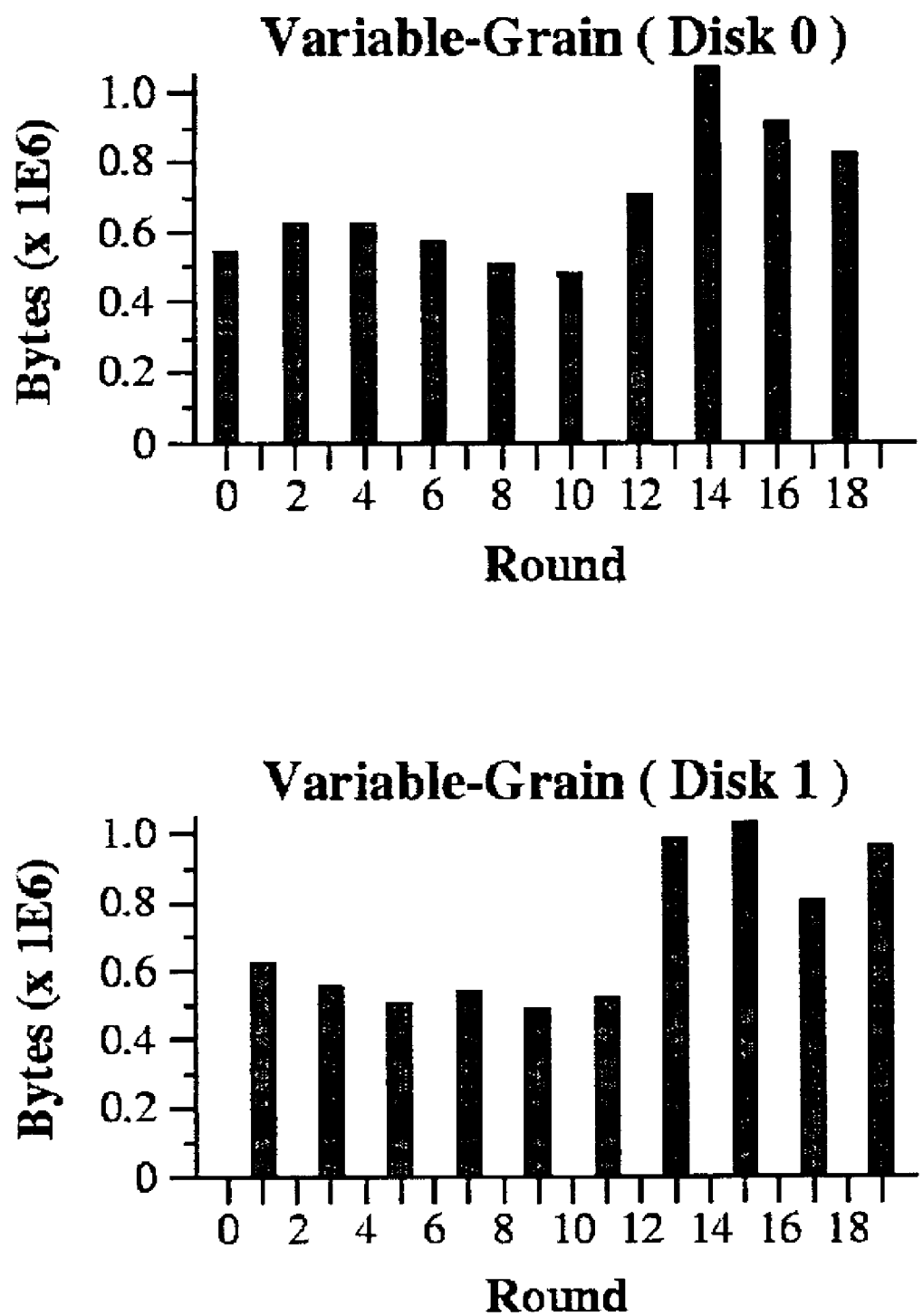
Figure 4C:
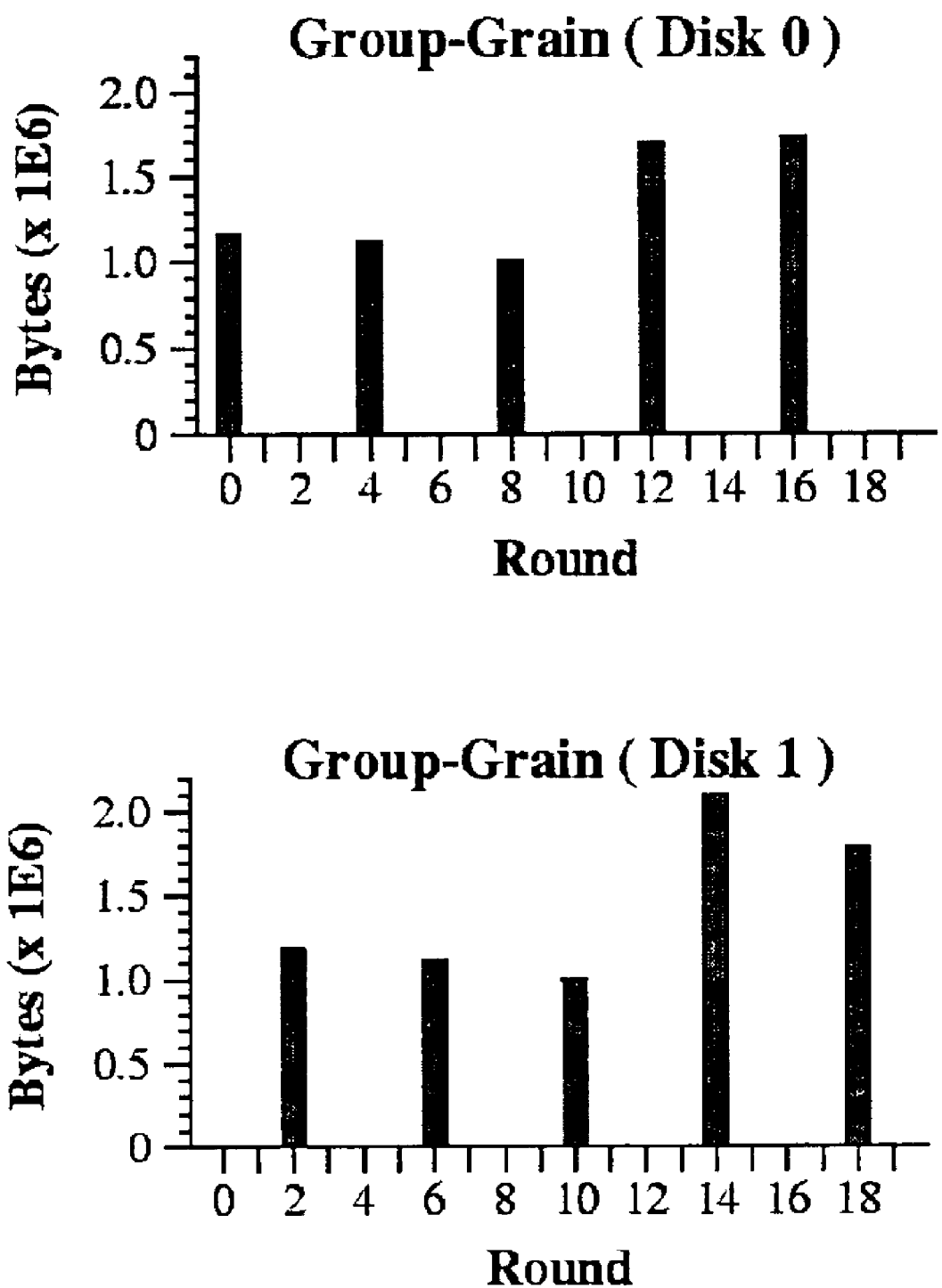

Referring to FIG. 3, there is illustrated a graph of data requirements of twenty consecutive rounds (one second each), in an MPEG-2 clip. Referring to FIGS. 4(a) to (c), there are illustrated graphs of data accesses for the clip of FIG. 3 using alternative striping techniques over two storage devices. With Fixed-Grain Striping, the needed blocks of size Bf are retrieved round-robin from the two storage devices every round. In Variable-Grain Striping, a different storage device is accessed in each round, according to the byte requirements of the original clip. In Group-Grain Striping with G=2, stream data worth of two rounds are accessed from a different storage device every two rounds.

With Fixed-Grain Striping, data are striped round-robin across the storage devices in blocks of a fixed size Bf, a multiple of the logical block size Bl defined previously. During each round, the required number of blocks are accessed from each storage device. An example of Fixed-Grain Striping is shown in FIG. 4(a). In the definition below, modD denotes the remainder of the division with D, and divD denotes the integer quotient of the division with D. The equation $$K^f(i) = \left\lceil \frac{\sum_{0 \leq j \leq i} S_d(j)}{B_f} \right\rceil,$$

specifies the cumulative number of blocks Bf retrieved through round i for a specific client. When $$K_{divD}^f(i) - K_{divD}^f(i-1)=0,$$

all blocks accessed for the client during round i lie on the same stripe of blocks. Then, the striping sequence Smd^f is equal to:

$$S_{md}^f(i,k)=D_0^f(i,k) \cdot B_f$$

where $$D_0^f(i,k) = \begin{cases} 1, & \text{if } K_{modD}^f(i-1) < k_{modD} \leq K_{modD}^f(i) \\ 0, & \text{otherwise,} \end{cases}$$

specifies the particular storage devices that need to be accessed at most once for the stream. When $$K_{divD}^f(i)-K_{divD}^f(i-1)>0,$$

the blocks accessed for the client during round i lie on more than one stripe, and the striping sequence becomes $$S_{md}^f(i,k)=(K_{divD}^f(i)-K_{divD}^f(i-1)-1)\cdot B_f+D_{>0}^f(i,k)\cdot B_f,$$

where $$D_{>0}^f(i,k) = \begin{cases} 2, & \text{if } K_{modD}^f(i-1) < k_{modD} \leq K_{modD}^f(i) \\ 1, & \text{if } k_{modD} > \max\left(K_{modD}^f(i-1), K_{modD}^f(i)\right)^t \\ 1, & \text{if } k_{modD} \leq \min\left(K_{modD}^f(i-1), K_{modD}^f(i)\right) \\ 0, & \text{otherwise.} \end{cases}$$

The first term in the Equation accounts for blocks in stripes fully accessed (i.e., all D blocks, where D is the number of storage devices), while the second term accounts for blocks of stripes partially accessed in round i (i.e., fewer than D blocks).

With Variable-Grain Striping, the data retrieved during a round for a client are always accessed from a single storage device round-robin, as shown in FIG. 4(b). The corresponding striping sequence becomes:

$$S_{md}^v(i,k)=(K^v(i)-K^v(i-1))\cdot B_l,$$

when i mod D=k, with $$K^{ij}(i) = \left\lceil \frac{\sum_{0 \le j \le i} S_d(j)}{B_l} \right\rceil,$$

and Smd^v(i,k)=0 when i mod D not equal k. Therefore, the Storage Device Sequence determines the particular single storage device accessed and the exact amount of data retrieved during each round.

Variable-Grain Striping is a special case (with G=1) of a method herein called Group-Grain Striping, where the amount of data required by a client over G rounds is retrieved every Gth round from one storage device that changes round robin (see FIG. 4(c), noting that the y-axis uses a different scale). The parameter G, G>=1, is called Group Size. The striping sequence for Group-Grain Striping is equal to:

$$S_{md}^g(i,k)=(K^v(i+G-1)-K^v(i-1))\cdot B_l$$

when i mod G=0 AND (i div G) mod D=k, and Smd^g(i,k)=0 otherwise.

As G increases, the fewer storage device accesses lead to reduced storage device overhead (although the access time per request is increased). On the other hand, the fixed round spacing between subsequent requests for a stream, basically divides the server into G virtual servers. The fixed group size G guarantees that two streams started from the same storage device at rounds i and j with i not equal j (mod G), do not have any storage device transfers in a common round. This is different from increasing Bf in Fixed-Grain Striping, where accesses from different streams can randomly coincide on the same storage device in the same round, resulting in the system saturating with fewer streams. Increasing G for a particular round time is advantageous with future expected changes in storage device technology.

Alternately, aggregation of storage device transfers can also be achieved with an appropriate increase of round time. However, this could directly affect the responsiveness of the system by potentially increasing the initiation latency of each playback. Longer round time would also increase the required buffer space.

It will be understood by those skilled in the art that the stride-based allocation scheme may be based on variable sized strides rather than fixed sized where each of the strides still satisfy the criteria of containing at least one round worth of stream data.

Figure 17:
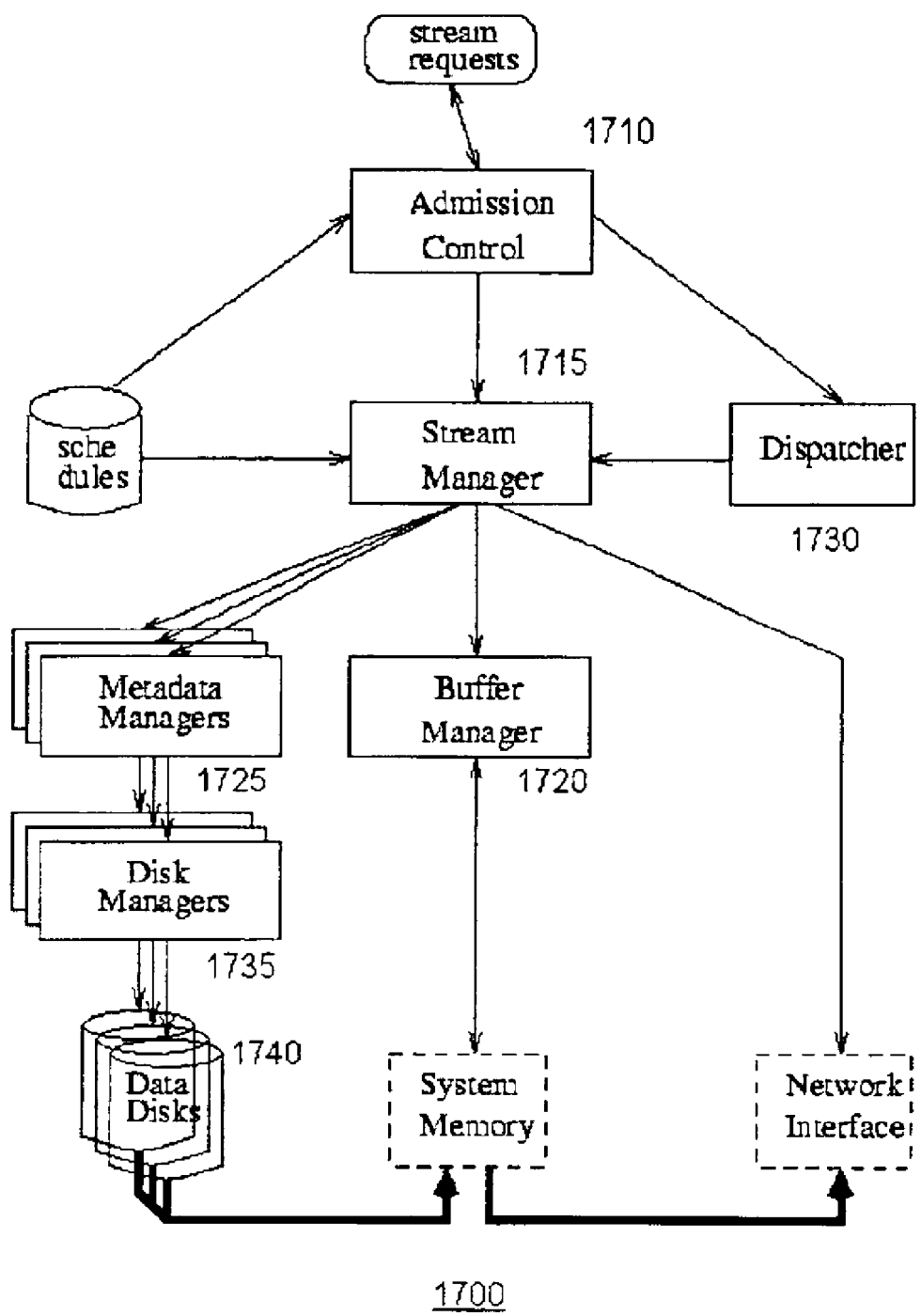
FIG. 17 is a functional block diagram of the distributed media server of FIG. 1.

Referring to FIG. 17, there is shown a functional block diagram of the distributed media server of FIG. 1. The architecture 1700 comprises admission control 1710, dispatcher 1730, stream manager 1715, buffer manager 1720, metadata managers 1725, storage device managers 1735, and storage devices 1740 that store the media data.

The basic functions of the media server include file naming, resource reservation, admission control, logical to physical metadata mapping, buffer management, and storage device and network transfer scheduling.

The admission control module 1710 uses circular vectors of sufficient length to represent the allocated storage device time, network time, and buffer space, respectively. On system startup, all elements of storage device time vectors are initialized to 2*TfullSeek, while the network time and buffer space vector elements are set to zero. When a new stream request arrives, the admission control 1710 is performed by checking the requirements of the stream against currently available resources. In particular, the total service time of each storage device 1740 in any round may not exceed the round duration, the total network service time on any network interface may not exceed the round duration, and the total occupied buffer space on any transfer node may be no larger than the corresponding server buffer capacity.

If the admission control test is passed, then the resource sequences of the stream are added to the corresponding system vectors managed by the module 1710, and the stream is scheduled for playback. The dispatcher 1730 is responsible for starting the playback at the appropriate round.

Figure 18:
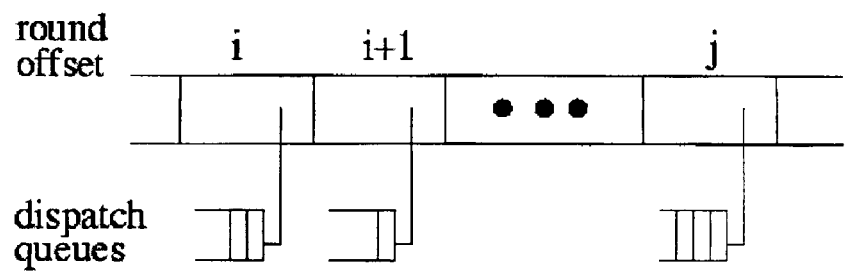
FIG. 18 is a block diagram of a circular vector of dispatch queues that keep track of admitted streams yet to be activated.

Referring to FIG. 18, there is shown a block diagram of a circular vector of dispatch queues that keeps track of admitted streams yet to be activated. Notification records for the accepted request are inserted into dispatch queues at the appropriate offset from the current round. When an upcoming round becomes current, the notification records are used for activating the stream and starting its data transfers.

The metadata manager 1725 for stream metadata management is organized in a layer above storage device scheduling. It is responsible for storage device space allocation during stream recording, and for translating stream file offsets to physical block locations during playback. The stream metadata are maintained as regular files in the host OS (of each transfer node, in the general case), while stream data are stored separately on dedicated storage devices. The storage space of the data storage devices 1740 is organized in strides, with a bitmap that has a separate bit for each stride. A single-level directory is used for mapping the identifier of each recorded stream into a direct index of the corresponding allocated strides. A separate directory of this form exists for each storage device.

When a stream is striped across multiple storage devices, a stream file is created on each data storage device. Each transfer request received by the metadata manager 1725 specifies the starting offset in the corresponding stream file and the number of logical blocks to be accessed. With the stream index, each such request is translated to a sequence of contiguous storage device transfers, each specifying the starting physical block location and the number of blocks. From the stride-based storage device space allocation, it follows that each logical request will be translated into at most two physical contiguous storage device transfers.

The provision of a separate metadata manager for each storage device has an advantage of application to general storage device array organization, including those consisting of heterogeneous storage devices. Although the handling of heterogeneous devices (for example disks of different sizes from different manufacturers) may not be necessary in limited size traditional storage systems, it might prove crucial for the incremental growth and survivability of large scalable media storage installations.

In order to keep system performance predictable and unbiased from particular storage device geometry features, some control is exercised on the storage device space allocation pattern. In particular, storage device zoning could possibly lead to excessively optimistic or pessimistic data access delays, if most allocation were in the outer or inner cylinders of the storage devices. Similarly, contiguous allocation could lead to lower than expected delays in some special cases (such as when streams are stored on a single storage device with a very large on-storage device cache). However, low-level storage device geometry is generally not disclosed by the storage device manufacturers, therefore, strides for a stream within each storage device were allocated to distribute them across all the zones of the storage device.

The storage device manager 1735 for storage device management layer is responsible to pass data transfer requests to the storage devices 1740, after the necessary translation from logical stream offsets to physical block locations in the above layers.

In the dual-queue CSCAN storage device scheduling used herein, the operation of each storage device is managed by a separate pair of priority queues, called Request Queue and Service Queue, respectively. The two queues, although structurally equivalent, play different roles during each round. At the beginning of each round, data transfer requests for the current round are added asynchronously into the request queue of each storage device, where they are kept sorted in increasing order of their starting sector location.

When all the requests have been gathered (and the corresponding storage device transfers of the previous round completed), the request queue of each storage device is swapped with the corresponding service queue. Subsequently, requests from the service queue are synchronously submitted to the raw storage device interface for the corresponding data transfers to occur. The two-queue scheme prevents new requests from getting service before those of the previous round complete. This keeps the system operation more stable in the rare (yet possible) case that the storage device busy time in a round slightly exceeds the round duration.

When swapping the two queues, the service queue becomes request queue and remains empty until the beginning of the next round. Although a single priority queue for each storage device would seem sufficient, there is a rare (yet possible) case where the storage device busy time in a round slightly exceeds the round duration. Then, with a naive design using a single queue, new incoming requests could postpone (potentially indefinitely) the service of requests from the previous round starting at the innermost edge of a storage device. Instead, the two-queue scheme prevents new requests from getting service before those of the previous round complete, thus keeping the system operation more stable.

The buffer manager 1720 keeps the server memory (system memory) organized in fixed size blocks of Bl bytes each, where Bl is the logical block size introduced earlier. Buffer space is allocated in groups of consecutive blocks. From experiments with raw interface storage device accesses, it was found that non-contiguity of the memory buffers could penalize storage device bandwidth significantly on some systems. Although this might be attributed to the way that scatter/gather features of the storage device controller are used by these systems, however, allocation contiguity was easy to enforce.

For the allocation of buffer blocks, a bitmap structure was used with an interface that supports block group requests. Deallocations are allowed on a block by block basis, even though entire block groups are acquired during allocation. This last feature allows more aggressive deallocations. Paging of buffer space is prevented by locking the corresponding pages in main memory.

The configuration input provides the basic parameters of each device that is used. This includes the storage device and metadata file name, the maximum and track seek time, the average rotation latency, the minimum internal transfer rate. Other configuration parameters include the available network bandwidth along with the server and client buffer space, as required by the different policies.

The stream manager 1715 is responsible for generating data transfer schedules, where each schedule specifies the amount of data accessed from the storage devices, stored in server buffer and transmitted over the network during each round. The schedule manager accepts as input actual media files (or their frame size traces), along with the prefetching and striping scheme that can be used. The prefetching schemes can make use of the buffer space that is available at the server or client side, depending on the policy.

Assuming that playback initiation requests arrive independently of one another, according to a Poisson process. The system load can be controlled by setting the mean arrival rate $\lambda$ of playback initiation requests. The maximum possible service rate $\mu$, expressed in streams per round for streams of data size Stot bytes, is equal to $\mu=D*Rstorage device*Tround/Stot$. Correspondingly, the system load $\rho$, is equal to $\rho=\lambda/\mu=<1$, $\lambda=\lambda max=\lambda$. The definition of $\rho$ is used in this evaluation.

When a playback request arrives, the admission control 1710 module checks whether available resources exist for every round during playback. The test considers the exact data transfers of the requested playback for every round and also the corresponding available storage device transfer time, network transfer time and buffer space in the system. If the request cannot be initiated in the next round, the test is repeated for each round up to $[1/\lambda]$ rounds into the future, until the first round is found, where the requested playback can be started with guaranteed sufficiency of resources. Checking $[1/\lambda]$ rounds into the future achieves most of the potential system capacity. If not accepted, the request is discarded rather than being kept in a queue.

Fault Tolerance for Media Servers

Figure 19:
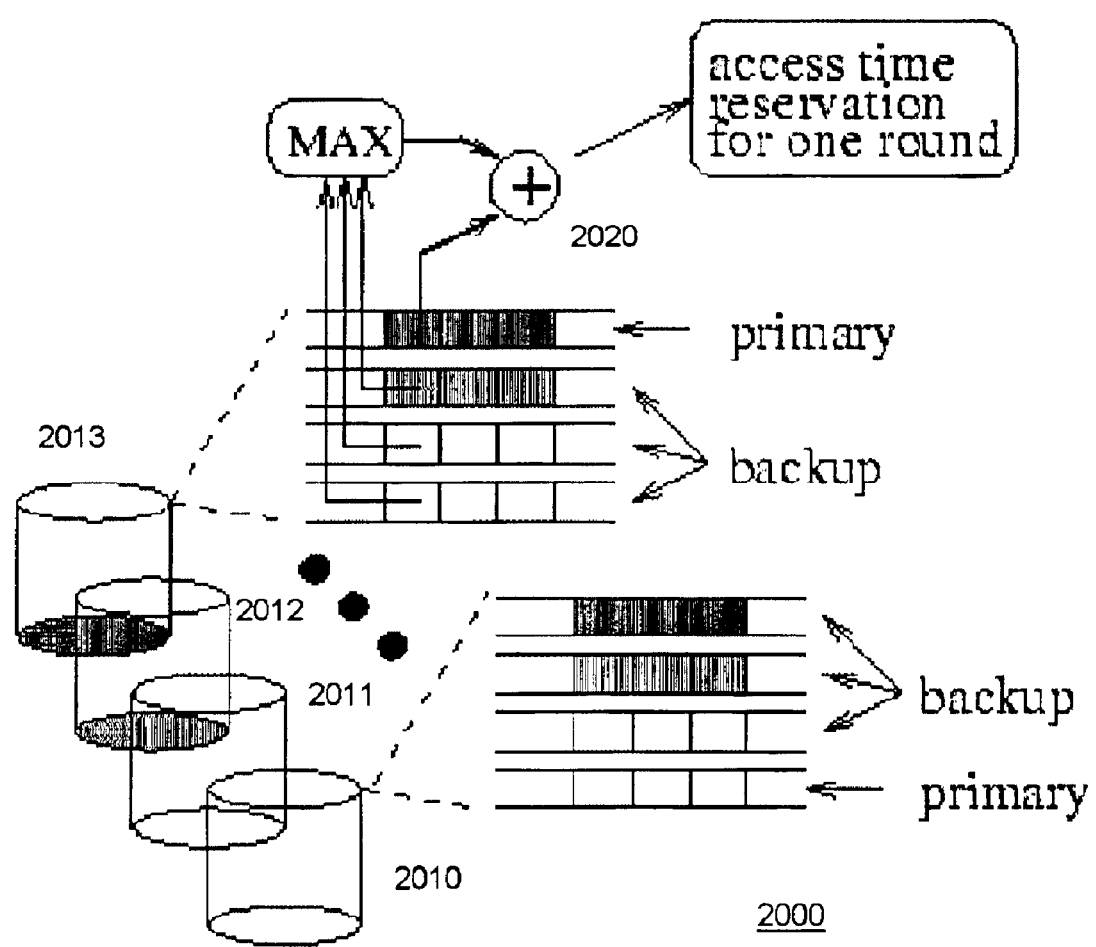
FIG. 19 is shown a block diagram of a fault-tolerant disk array for a media server.

Referring to FIG. 19, there is shown a block diagram of a fault tolerance storage device array for a media server. The array 2000 is configured for single storage device failure and comprises four disks 2010 to 2013 where content of each of the disks is replicated across the other three disks. Each unit of replication corresponds to data retrieved by a client during one round of playback. Each storage device has primary data for a stream and one backup replica of the primary data is stored spread over the other storage devices.

The methods of replication include deterministic replica placement and random replica placement. In deterministic replica placement, data of a media file stored consecutively on disk 2010 and retrieved during different playback rounds are replicated round-robin across the other disks. The primary data of the other disks are replicated in a similar way. In random replica placement, data of a media file stored consecutively on disk 2010 and retrieved during different playback rounds are replicated on randomly chosen disks 2011 to 2013 where data for each round is replicated on a randomly disk chosen from disks 2011 to 2013. The primary data of the other disks are replicated in a similar way.

An aspect of an objective is to allocate resources in such a manner that service to accepted stream requests are not interrupted during (single) storage device failures. Retrieving backup replicas of data stored on a failed storage device requires extra bandwidth to be reserved in advance across the surviving storage devices. Thus, the array 2000 normally operates below full capacity. Alternatively, when a storage device fails and no extra bandwidth has been reserved, service will become unavailable for a number of active users with aggregate bandwidth requirements no less than the transfer capacity of one storage device, assuming that data have been replicated as described previously.

The load that is normally handled by a failed storage device is equally divided among the D–1 surviving storage devices. Thus, tolerating one storage device failure requires that extra bandwidth be reserved on each storage device equal to 1/(D−1) the bandwidth capacity of one storage device. In order to achieve this, the access time of the backup replicas stored on one storage device are accumulated separately for every storage device that stores the corresponding primary data. When a storage device fails, the extra access load incurred on every surviving storage device is approximately known. In fact, the additional access time that has to be reserved on a storage device in each round is equal to the maximum time required for retrieving backup replicas for another storage device that has failed as shown by adder 2020 of FIG. 19.

For each storage device, D separate vectors indexed by round number are maintained. One of the vectors accumulates access delays for retrieving primary data. The remaining D−1 vectors accumulate access delays for retrieving backup replicas that correspond to primary data stored on each of the other D−1 storage devices. Thus, in each round, the sum of the primary data access time and the maximum of the backup data access times is reserved on each storage device. This method is herein referred to as Minimum Reservation.

The minimum reservation scheme requires maintaining the number of vectors equal to the square of the number of storage devices. Each vector is accessed in a circular fashion and has minimum length equal to that of the longest stream expressed in numbers of rounds. When using large storage device arrays, this might raise concerns regarding the computational and memory requirements involved. In practice, the reduction in unused bandwidth is diminishing as the number of storage devices increases beyond sixteen. Therefore, it makes sense to apply the data replication within storage device groups of limited size, when the storage device array size becomes larger. This keeps the bookkeeping overhead limited and preserves the scalability of this method when stream data are striped across large storage device arrays.

It will be understood by those skilled in the art that the Minimum Reservation method may be applied to different computer nodes when primary data of each computer node is replicated across other computer nodes. Thus, when one node goes down, the primary data from all its storage devices is still accessible through replicas available on the other computer nodes. In servers consisting of multiple nodes, failure of an entire node can be handled gracefully, by keeping each storage device of a node in a separate storage device group and limiting the replication within each group. When a node fails, inaccessible data for each of its storage devices can be retrieved using replicas available on other storage devices of the corresponding groups It will be understood by those skilled in the art that the Minimum Reservation method may also be applied for handling multiple storage device failures which only requires storing multiple backup replicas, and making bandwidth reservations for more than one failed storage device accordingly.

Figure 16:
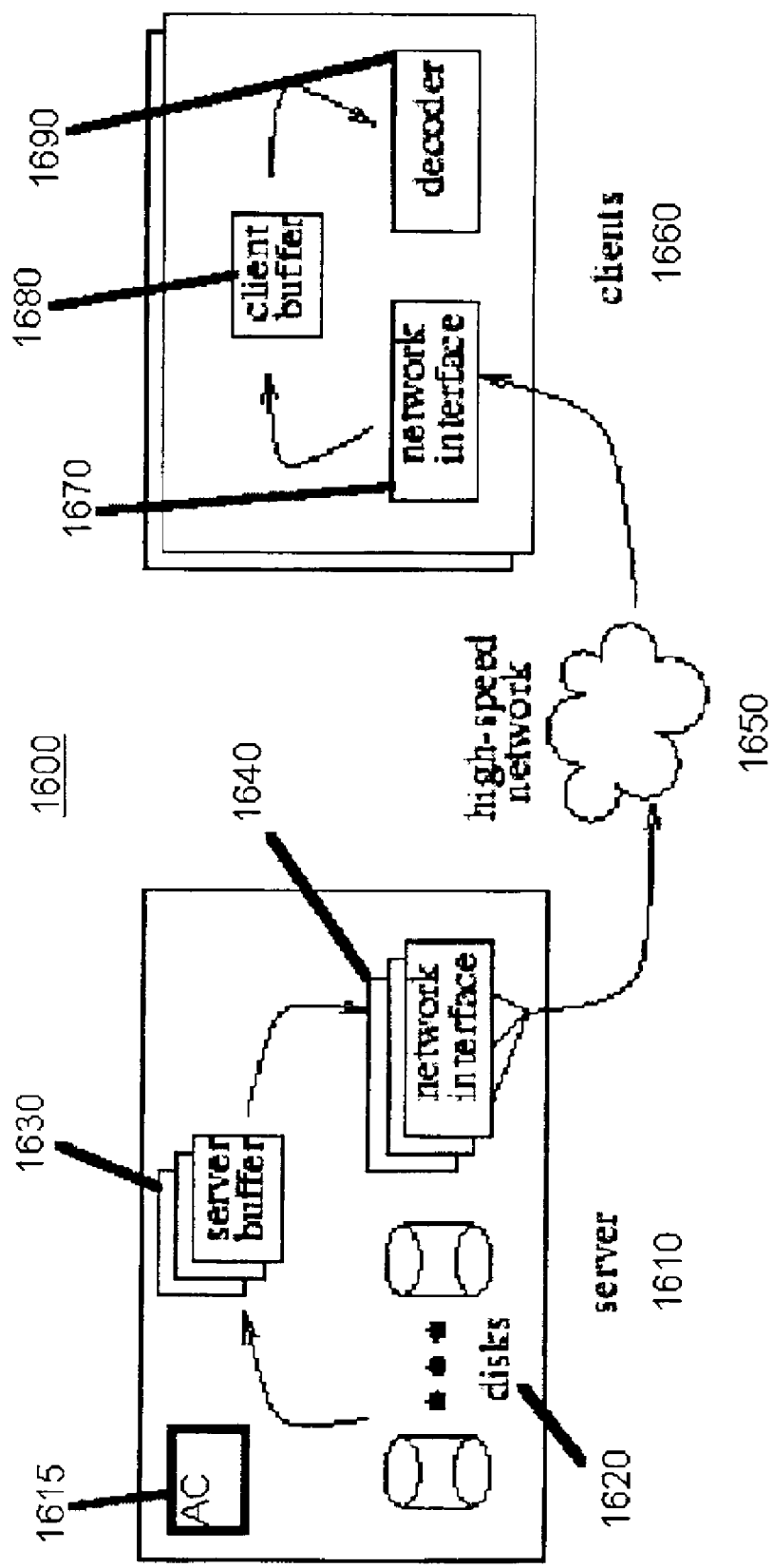
FIG. 16 is a server-based system for smoothing of variable bit-rate streams.

Server-Based Smoothing Referring to FIG. 16, there is provided a system 1600 for server-based smoothing of variable bit-rate streams. The system 1600 comprises a server 1610 having storage devices 1620 for storing stream data, server buffers 1630 for buffering the content prior to transmission, and network interfaces 1640 for interfacing to a network 1650; and clients 1660 to receive the data over client network interfaces 1670 where client buffers 1680 buffers the data before decoding by decoders 1690.

The system 1600 operates according to a server-push model such that when a playback session starts, the server 1610 periodically sends data to the client 1660 until either the end of the stream is reached, or the client 1660 explicitly requests suspension of the playback. Data transfers occur in rounds of fixed duration Tround. In each round, an appropriate amount of data is retrieved from the storage devices 1620 into a set of server buffers 1630 reserved for each active client. Concurrently, data are sent from the server buffers 1630 to the client 1640 over the network 1650.

The amount of stream data periodically sent to the client 1660 is determined by the decoding frame rate of the stream and the resource management policy of the server-based system 1600. A policy is to set to send to the client 1660 during each round the amount of data that is needed for the decoding process at the client in the next round; any other policy that does not violate the timing requirements and buffering constraints of the decoding client would be also acceptable.

The streams are compressed according to the MPEG-2 specification, or any other encoding scheme that supports constant quality quantization parameters and variable bit rates. The stream data are stored across the multiple storage devices 1620.

Playback requests arriving from the clients 1660 are initially directed to an admission control module 1615, where it is determined whether enough resources exist to activate the requested playback session either immediately or within a limited number of rounds. The admission control module maintains a schedule (scheduling information) on how much data needs to be accessed from each storage device of the storage devices 1620 in any given round, the amount of server buffer space required from the server buffers 1630, and how much data needs to be transferred to the client 1660.

This scheduling information for each of the stream files is generated when the media stream is first stored and is generated by scheduling to prefetch stream data so that storage device bandwidth peaks are smoothed out. By smoothing out the peaks, a greater number of streams may be accessed from a set of storage devices at any one time.

One crucial issue with storage device prefetching is how to maintain an appropriate balance between storage device bandwidth and server buffer space usage. Too aggressive prefetching can limit the number of concurrent streams that can be supported because of excessive server buffer usage.

In accordance with an embodiment of the present invention, there is provided a stream scheduling procedure that specifies for each stream both the variable server buffer and storage device bandwidth requirements over time. A storage device block b originally scheduled for round i is prefetched in a previous round j only if: i) the storage device bandwidth requirement in round j with the prefetched block does not exceed the original storage device bandwidth requirement of round i, and ii) the proportion of server buffer required in each of the rounds j up to i−1 after prefetching block b does not exceed the proportion of storage device bandwidth required in round i without b.

The first condition is necessary in order for the prefetching to have a smoothing effect on the storage device bandwidth requirements over time. The second condition is a heuristic that is applied in order to prevent exhaustion of the server buffer. Both conditions are applied to individual streams, and to multiple streams concurrently.

Thus, the stream smoothing method prefetches data into server buffers, and has several important advantages: ability to support clients with minimal memory resources (such as inexpensive mass-produced specialized devices) and still benefit from smoothing, optimizing for storage device bandwidth that is estimated to increase at rates an order of magnitude slower than network link bandwidth, reduced complexity in admission control processing by not having to support a separate transfer schedule for each individual client type, and reduced stream replication with storage device striping policies that are based on a specified client configuration and retrieval sequence.

A "smoothness" criterion that is based on Majorization Theory is used. For any x=(x1, . . . ,xn) in $R^n$, let the square bracket subscripts denote the elements of x in decreasing order x[1]>=?>=x[n]. For x,y in $R^n$, x is majorized by y, x<y, if:

$$\sum_{i=1}^{k} x_{[i]} \leq \sum_{i=1}^{k} y_{[i]}, k = 1, \ldots, n-1$$

and $$\sum_{i=1}^{n} x_{[i]} = \sum_{i=1}^{n} y_{[i]}.$$

Then, consider x smoother than y, if x<y. Finally, we call a vector x in $R^n$ majorization-minimal if there is no other vector z in $R^n$ such that z<x.

In accordance with another embodiment of the present invention, there is provided a method that, given a stream network sequence Sn and a target server configuration, generates a smoothed storage device sequence Sd. The generated storage device sequence is majorization-minimal under the specified constraints. The generated storage device sequence is subsequently transformed into a striping sequence Sm according to some storage device striping method, such as the Variable-Grain Striping.

The storage device time reservation for a disk transfer of X bytes is approximately equal to:

$$T_{disk}(X) = 2 \cdot (T_{trackSeek} + T_{avgRot}) + X/R_{disk}.$$

Definition 1: Let the Disk Time Proportion of X bytes, Pd(X), be the fraction of the round time Tround that the disk time reservation Tdisk(X) occupies: Pd(X)=Tdisk(X)/Tround. Further let the Buffer Space Proportion of X bytes, Pb(X), be the fraction of the buffer space for each disk, Bdisk, (Bdisk is the total server buffer divided by the number of disks D) that X bytes occupy in a round: Pb(X)=X/Bdisk. Then, the Maximum Resource Proportion in round i, is the maximum of the corresponding disk time and buffer space proportions in that round: {\small max(Pd(Sd(i)),Pb(Sb(i)))}.

The above utilization definitions refer to resource reservations within a round. However, for conciseness of the following presentation, the words Round and Reserved are dropped and are refer to as Disk Utilization, Buffer Utilization and Maximum Utilization, respectively.

Definition 2: The Deadline Round for a block is the latest round at which the block can be accessed from the storage device without incurring a real-time violation at the network transfer. Then, with respect to a specific block, all rounds before the deadline round are considered Candidate Rounds and the one actually chosen for prefetching is called the Prefetch Round. All the rounds between the deadline and a prefetch round are called Shift Rounds. These definitions only affect the number of blocks accessed in each round, since stream block accesses are done sequentially during playback.

Definition 3: The Maximum-Proportion Constraint is defined as the requirement that the maximum resource proportion of the deadline round is no less than the maximum resource proportion of the corresponding (if any) prefetch and shift rounds.

The Server Smoothing method is as follows:

```
0. proc serverSmoothing
1.   input : Ln, Sn[] ( =0 outside [1..Ld] ), Bt
2.   output : Ld, Sd[], Lb, Sb[]
3.   begin
4.      blockQuantize(Ln, Sn[], Bt) (* see App. B *)
5.      for trnd : 0..Ln-1
6.         if ( Pbuf(Sb(trnd)) < Pdek(Sd(trnd)) )
7.            repeat
8.               tmin := trnd
9.               Pmin := max( Pdsk(Sd(trnd)), Pbuf(Sb(trnd)) )
10.              tprv := trnd - 1, prefFailed := false
11.              while (prefFailed = false AND tprv >= 0)
12.                 Pprf = max( Pdek(Sd(tprv)) + Bt),
13.                              Pbuf(Sb(tprv)) + Bt) )
14.                 Pshf = max( Pdek(Sd(tprv)),
15.                              Pbuf(Sb(tprv)) + Bt) )
16.                 (*check for max proportion decrease*)
17.                 if (Pprf < Pmin)
18.                    tmin = tprv, Pmin = Pprf
19.                 else if (Pmin < Pshf)
20.                    prefFailed := true
21.                 end-if
22.                 tprv := tprv - 1
23.              end-while
24.              if (tmin < trnd) (* update vectors *)
25.                 Sd(tmin) := Sd(tmin) + Bt
26.                 Sb(tmin) := Sb(tmin) + Bt
27.                 for tprv := tmin + 1 .. trnd - 1
28.                    Sb(tprv) := Sb(tprv) + Bt
29.                 end-for
30.                 Sd(trnd) := Sd(trnd) - Bt
31.              end-if
32.           until (tmin >= trnd) (*prefetch search failed*)
33.        end-if
34.     end-for
35. end
```

This method initially invokes the blockQuantize procedure

The BlockQuantize Procedure

```
0. proc blockQuantize
1.   input : Ln, Sn[] ( =0 outside [1..Ln] ), Bt
2.   output : Ld, Sd[], Lb, Sb[]
3.   begin
4.      Sd[] := 0, Sb[] := 0
5.      Ld := Ln, Lb := Ln + 1
6.      totSn := 0
7.      for trnd : 0..Ln
8.         prvSn := totSn, totSn := totSn + Sn(trnd + 1)
9.         (* to use function ceil() for the [] operation *)
10.        Sd(trnd) := Bt · ( ceil(totSn/Bt) - ceil(prvSn/Bt) )
11.        Sb(trnd) := Sb(trnd - 1) + Sd(trnd) = Sn(trnd - 1)
12.     end-for
13. end
``` that generates storage device and buffer sequences with data transfer sizes that are integral multiples of the logical block Bl. Network transfers are specified in byte granularity for increased flexibility (if necessary, they could be quantized too). Then, rounds of the generated sequences are visited in increasing order starting from round zero. For every logical block to be retrieved from the storage device in the currently visited round, previous rounds are examined linearly in decreasing order towards round zero for potential prefetching of the block. Each such search completes successfully when a prefetch round is found such that the maximum resource proportion of the current round decreases while remaining higher than those of the prefetch and shift rounds.

This implies that the storage sequence can be smoothed out without incurring buffer space proportion peaks exceeding the storage device time proportion of the current round. Otherwise, the block prefetching operation will not have any positive smoothing effect overall, and the corresponding search fails.

It has traditionally been assumed that storage device arrays consist of homogeneous storage devices (for example identical disks from the same manufacturer), presumably in order to keep the system complexity manageable. With the scalability of stream striping demonstrated and the sequential access of stored video making things somewhat simpler, systems with different storage devices types may be provided that may be scaled incrementally with the newest storage device technology. Newer storage device models typically achieve higher transfer rates and have larger storage capacities.

The objective is to maximize the number of active streams by increasing the storage device bandwidth utilization across all the storage devices. This might lead to suboptimal storage capacity utilization, assuming it is affordable given the current technology trends. In order to maximize the storage device bandwidth utilization, the Server Smoothing method is extended to handle heterogeneous storage devices. In particular, the disk time Tdisk(X) and the disk time proportion function P_d(X) was redefined to accept a second disk type argument k that specifies the particular disk parameters to be used P_d(X, k)=Tdisk(X,k)/Tround. During the operation of the Server Smoothing method, the disk type k assumed in each round i can be derived using a simple rule, such as k=i(mod D), where D is the total number of the disks.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

The examples are described for the purposes of illustration and are not intended to limit the scope of the invention.

A Media Server System

A media server system or stream server system was built in order to evaluate the resource requirements of the different striping techniques. The modules were implemented in about 17,000 lines of C++/Pthreads code on AIX4.1, and ran on a single node. The code was linked either to the University of Michigan DiskSim disk simulation package, which incorporated advanced features of modern disks such as on-disk cache and zones for simulated disk access time measurements, or to hardware disks through their raw device interfaces. The indexing metadata were stored as regular Unix files, and during operation were kept in main memory. The MPEG-2 decoder from the MPEG Software Simulation Group was used for stream frame size identification.

The basic responsibilities of the media server included file naming, resource reservation, admission control, logical to physical metadata mapping, buffer management, and disk and network transfer scheduling.

With appropriate configuration parameters, the system operated at different levels of detail. In Admission Control mode, the system receives playback requests, does admission control and resource reservation but no actual data transfers take place. In Simulated Disk mode, all the modules are functional, and disk request processing takes place using the specified DiskSim disk array.

The system was primarily used in Admission Control mode (except for our validation study, where the system was used in Simulated Disk mode). The Admission Control module used circular vectors of sufficient length to represent the allocated time of each disk, the network time, and the buffer space respectively. On system startup, the disk time vectors are initialized to $2 \cdot TfullSeek$, while the network time and buffer space are initially set to zero. When a new stream request arrived, admission control is performed by checking against current available resources. In particular, the total service time of each disk in any round may not exceed the round duration, and the total network service time may also not exceed the round duration, while the total occupied buffer space may be no longer than the server buffer capacity. If the admission control test was passed, the resource sequences of the stream are added to the corresponding vectors of the module, and the stream is scheduled for playback.

Performance Evaluation Method

The playback initiation requests arrived independently of one another, according to a Poisson process. The system load was controlled through the mean arrival rate $\lambda$ of playback initiation requests. Assuming that disk transfers form the bottleneck resource, in a perfectly efficient system there is no disk overhead involved in accessing disk data. Then, the maximum arrival rate $\lambda$ was chosen to equal $\lambda max$ of playback initiation requests, that corresponds to system load 100%, to be equal to the mean service rate with which stream playbacks would complete in that perfectly efficient system. This makes it possible to show the performance benefit of arbitrarily efficient data striping policies. Subsequently, the mean service rate $\mu$, expressed in streams per round, for streams of data size Stot bytes becomes: $\mu=D \cdot Rdisk \cdot Tround/Stot$. Correspondingly, the system load $\rho$, was set equal to: $\rho=\lambda/\mu=<1$, where $\lambda=<\lambda max=\mu$.

Another important decision had to do with the admission control process. When a playback request arrived, it is checked to determine if available resources existed for every round during playback. The test considered the exact data transfers of the requested playback for every round and also the corresponding available disk transfer time, network transfer time and buffer space in the system. If the next round failed this test, it is repeated until the first future round is found, where the requested playback can be started with guaranteed sufficiency of resources.

The lookahead distance Hl was defined as the number of future rounds that are considered as candidate rounds for initiating the stream for each request before it is rejected. Playback requests not accepted were turned away rather than being kept in a queue. Practically, a large lookahead distance allowed a long potential waiting time for the initiation of the playback. It cannot be unlimited in order for the service to be acceptable by the users. On the other hand, setting the lookahead distance too small can prevent the system from reaching full capacity.

The basic lookahead distance Hl^basic was set to be equal to the mean number of rounds between request arrivals Hl^basic=1/$\lambda$. Setting Hl=Hl^basic allows the system to consider for admission control the number of upcoming rounds that will take (on average) for another request to arrive. More generally, a lookahead factor Fl is defined as the fraction Fl=Hl/Hl^basic.

As the basic performance metric, the expected number of active playback sessions that can be supported by the server was chosen. The objective was to make this number as high as possible.

Setup

Six different VBR MPEG-2 streams of 30 minutes duration each were used. Each stream had 54,000 frames with a resolution of 720×480 and 24 bit color depth, 30 frames per second frequency, and a $IB^2PB^2PB^2PB^2PB^2$ 15 frame Group of Pictures structure. The encoding hardware that was used allowed the generated bit rate to take values between 1 Mbps and 9.6 Mbps. Although the MPEG-2 specification allows bit rates up to 15 Mbit/sec, there is a typical point of diminishing returns (no visual difference between original and compressed video) at 9 Mbit/sec. The DVD specification sets a maximum allowed MPEG-2 bit rate of 9.8 Mbit/sec. Statistical characteristics of the clips are given in Table 1, where the coefficients of variation (CoV) lie between 0.028 and 0.383, depending on the content type. In the mixed basic benchmark, the six different streams were submitted in a round-robin fashion. Where necessary, the results from individual stream types are also shown.

TABLE 1

| Content Type | Avg Bytes per rnd | Max Bytes per rnd | CoV per rnd |
|---|---|---|---|
| Science Fiction | 624935 | 1201221 | 0.383 |
| Music Clip | 624728 | 1201221 | 0.366 |
| Action | 624194 | 1201221 | 0.245 |
| Talk Show | 624729 | 1201221 | 0.234 |
| Adventure | 624658 | 1201221 | 0.201 |
| Documentary | 625062 | 625786 | 0.028 |

For the measurements, Seagate Cheetah ST-34501 SCSI disks were assumed, with the features shown in Table 2. Except for the storage capacity, which can reach 73GB in the latest models, the rest of the performance numbers are typical of today's high-end drives. The logical block size Bl was set to 16,384 bytes, while the physical sector size Bp was equal to 512 bytes. The stride size Bs in the disk space allocation was set to 1,572,864 bytes. The server memory was organized in buffers of fixed size Bl=16,384 bytes each, with a total space of 64 MB for every extra disk. The available network bandwidth was assumed to be infinite.

TABLE 2

| Seagate Cheetah ST-34501 | |
|---|---|
| Data Bytes per Drive | 4.55 GByte |
| Average Sectors per Track | 170 |
| Data Cylinders | 6,526 |
| Data Surfaces | 8 |
| Zones | 7 |
| Buffer Size | 0.5 MByte |
| Track to Track Seek (read/write) | 0.98/1.24 msec |
| Maximum Seek (read/write) | 18.2/19.2 msec |
| Average Rotational Latency | 2.99 msec |
| Internal Transfer Rate | |
| Inner Zone to Outer Zone Burst | 122 to 177 Mbits |
| Inner Zone to Outer Zone Sustained | 11.3 to 16.8 MByte |

The round time was set equal to one second. A warm up period of 3,000 rounds was used and calculated the average number of active streams from round 3,000 to round 9,000. The measurements were repeated until the half-length of the 95% confidence interval was within 5% of the estimated mean value of the active streams.

Example on Fixed-Grain Striping

In respect of Fixed-Grain Striping, an important feature of this method is the ability to control the disk access efficiency through the choice of block size Bf. As the block size is increased, a larger part of each access is devoted to data transfer rather than mechanical movement overhead. When a stream requests more than one block from a particular disk during a round, a maximum of two contiguous accesses is sufficient with the stride-based disk space allocation used.

Figure 5:
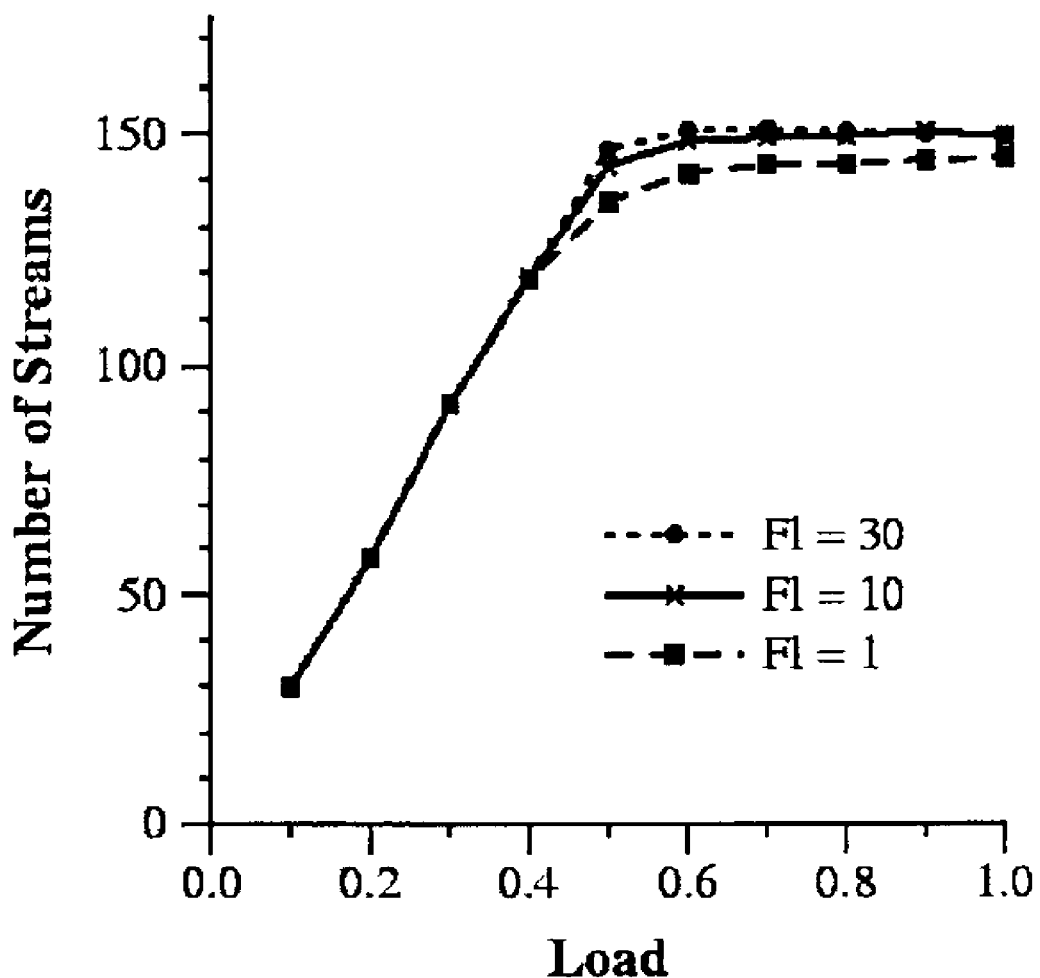
FIG. 5 is a graph of number of streams versus load under Fixed-Grain Striping.

Referring to FIG. 5, there is shown a graph of number of streams versus load under Fixed-Grain Striping where the number of active streams with sixteen disks and the mixed workload increases linearly as the load, $\rho$, increases from 10% to 50%. At loads higher than 50%, the number of streams that can be supported no longer increases. Since increasing the lookahead factor (F1) from 1 to 30 improves the number of streams that can be supported only marginally, for the rest of the experiments, the lookahead factor F1 was set to 1. This corresponds to a lookahead distance of less than 10 rounds, for a system of sixteen disks operating at load $\rho$=80%, and half-hour clips of 1 GByte each.

Figure 6:
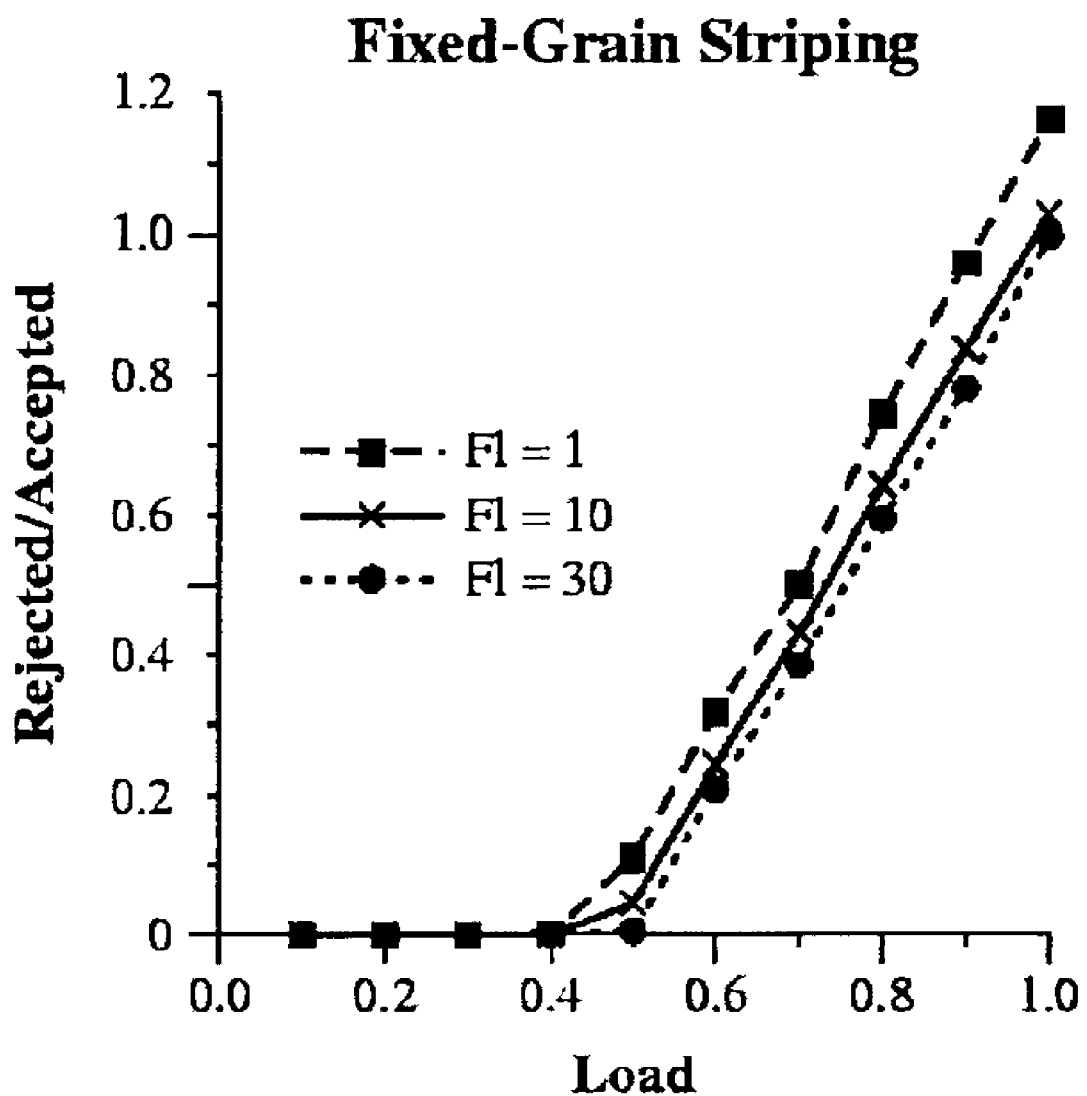
FIG. 6 is a graph of a ratio of total number of rejected streams over total number of accepted streams versus load under Fixed-Grain Striping.

Referring to FIG. 6, there is shown a graph of a ratio of total number of rejected streams over total number of accepted streams versus load under Fixed-Grain Striping where the additional load beyond 50% translates into a corresponding increase in the number of rejected streams.

Figure 7:
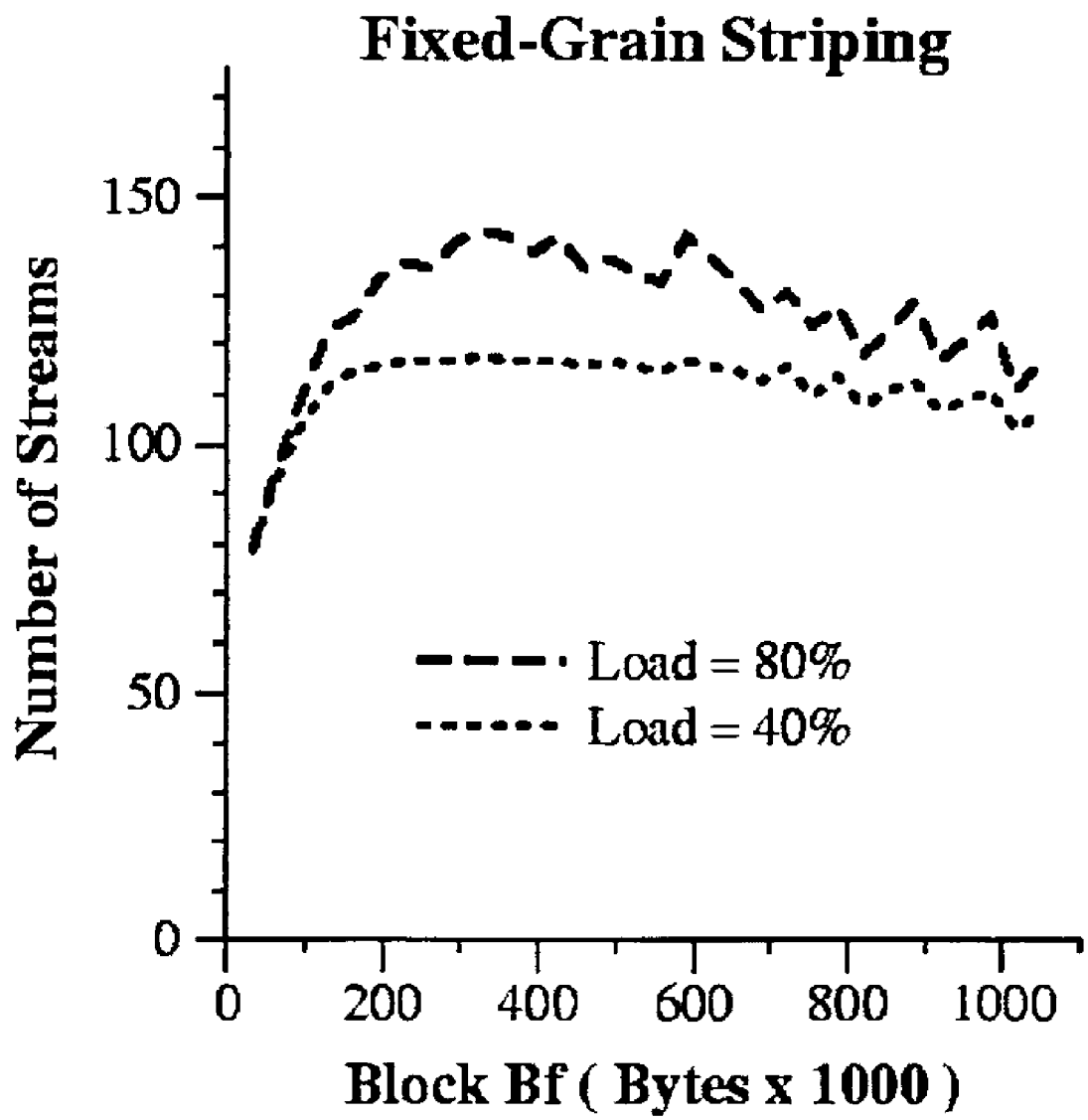
FIG. 7 is a graph of number of streams versus block size Bf under Fixed-Grain Striping.

Referring to FIG. 7, there is shown a graph of number of streams versus block size Bf under Fixed-Grain Striping. For load values $\rho$=40% and $\rho$=80%, the number of active streams were measured as the block size increased from Bf=32,768 to Bf=1,048,576 bytes at steps of 32,768. As can be seen from FIG. 7, at load 80% the number of streams initially increases until Bf becomes equal to 327,680 and then drops. A similar behavior is noticed at 40%, although the variation in the number of streams is much smaller across different block sizes.

The Admission Control mode that was used for the above experiments allowed the gathering of statistics on system resources reserved for each round during the admission control process.

Figure 8:
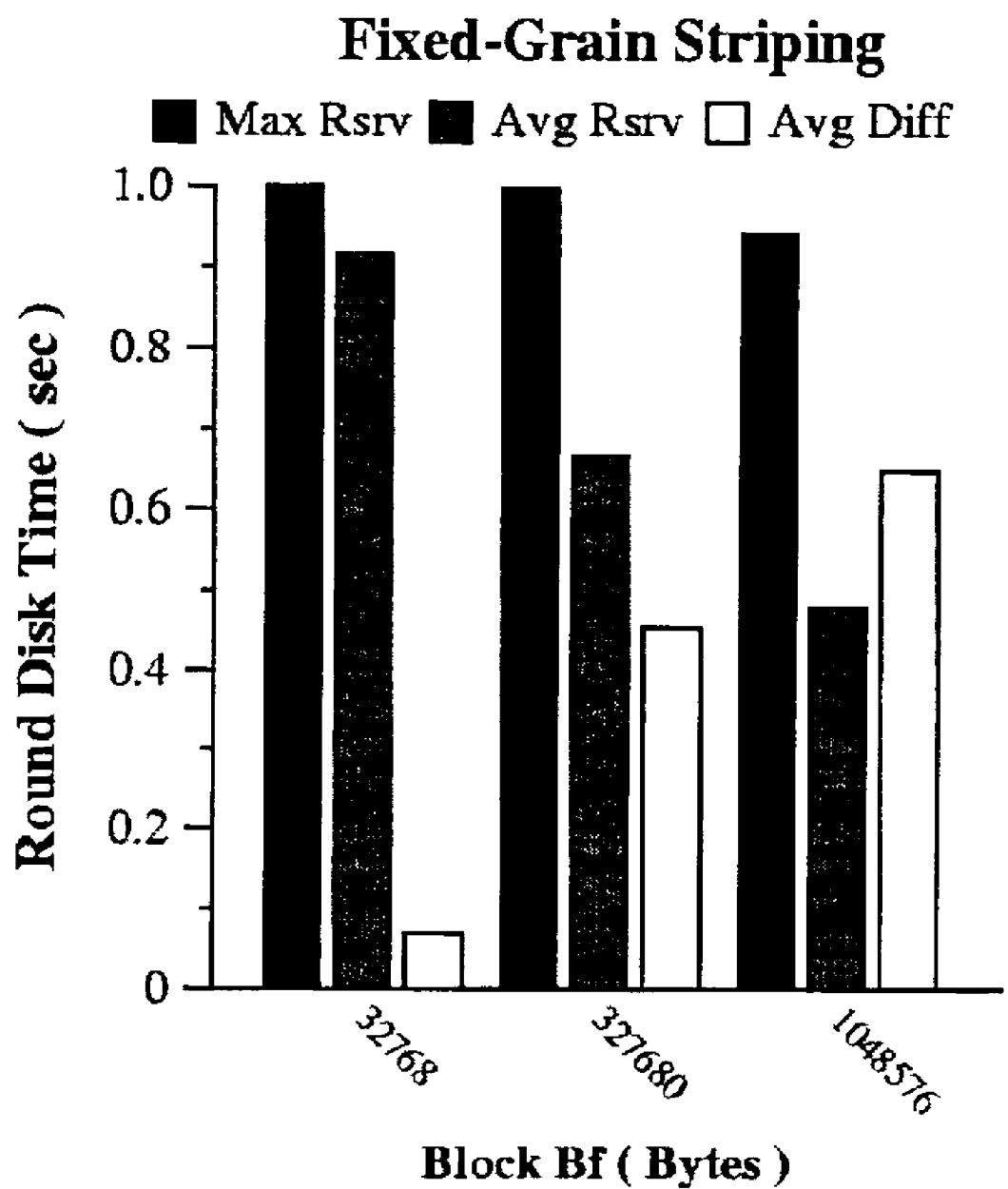
FIG. 8 is a graph of round disk time versus block size Bf under Fixed-Grain Striping.

Referring to FIG. 8, there is shown a graph of round disk time versus block size Bf under Fixed-Grain Striping. In particular, FIG. 8 depicts the maximum and average access time Tdisk(i,k) that was reserved during the measurement period 3,000=<i<9,000 for a particular disk (k=0) in a sixteen disk configuration with load $\rho$=80%. While the maximum time remains close to 100% across different block sizes, the average time drops from about 90% at Bf=32,768 to less than 50% at Bf=1,048,576.

With the round time set to 1 sec, the average time (normalized by the round time) corresponds to the expected disk utilization and varies depending on the number of disks accessed for a stream every round. Part of it was actuator overhead and decreased as the block size becomes larger. On the other hand, the maximum difference in reserved access times in a round (Avg Diff in FIG. 8) increased on average from almost zero to above 60%, with increasing block size Bf. This could be another reason for the decrease in the average reserved time for larger block sizes.

It was also found that the average reserved time (shown in FIG. 8 only for Disk 0) remains about the same (typically within 2%) across a disk array. Thus, the access load, on average, was equally distributed across the disks, despite variations from round to round.

Figure 9:
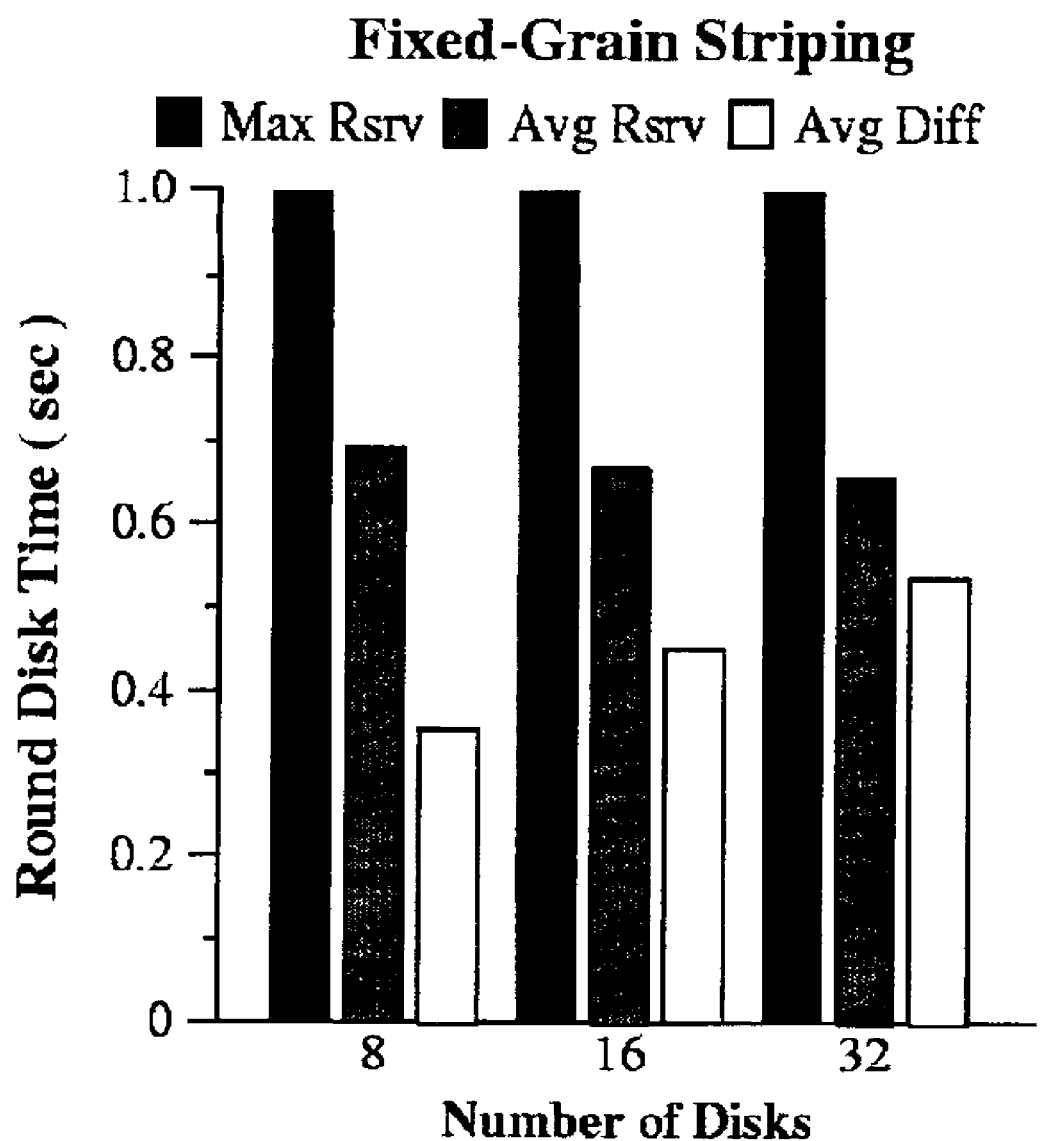
FIG. 9 is a graph of disk busy time per round versus number of disks under Fixed-Grain Striping.

Referring to FIG. 9, there is shown a graph of round disk time versus number of disks under Fixed-Grain Striping. As the number of disks increases, the average time drops only slightly from 69% with 8 disks to 67% with 16 and 66% with 32 disks. It is anticipated that the capacity of the system will increase almost linearly as more disks are added.

Figure 10:
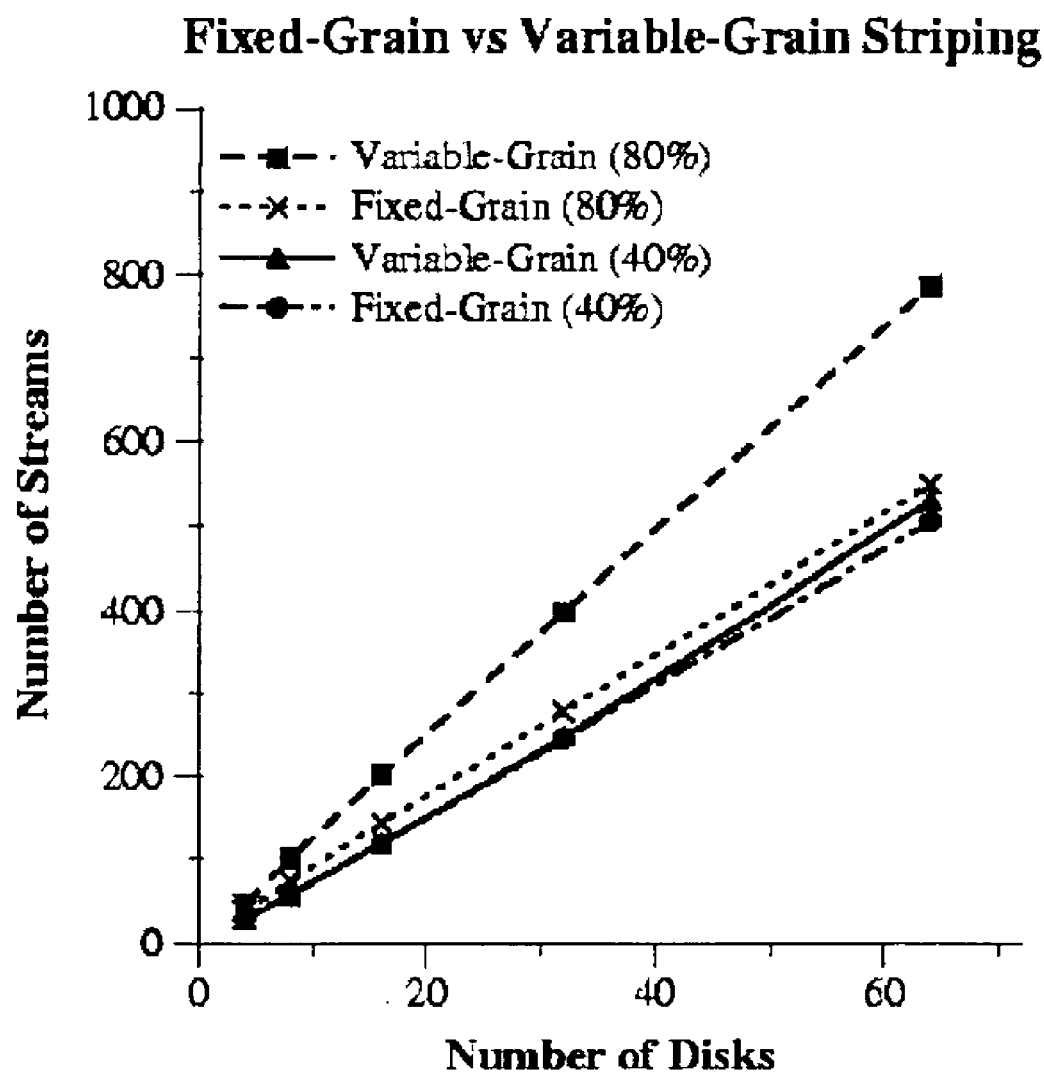
FIG. 10 is a graph of number of streams versus number of disks under Fixed-Grain Striping.

Referring to FIG. 10, there is shown a graph of number of streams versus number of disks under Fixed-Grain Striping. The measurements were repeated varying the number of disks from 4 to 64. The block size Bf, that maximized the number of streams, was found to remain at Bf=327,680. At 80% load, the number of streams that could be supported increased from 39.17 with 4 disks to 143.57 with 16 disks and 550.23 with 64 disks. This is within 9–14% of what perfectly linear scalability should achieve. With the load at 40%, the number of streams increased from 30.31 with 4 disks to 504.79 with 64 disk, thus reflecting the improved capacity of the system with increased number of disks at low loads.

With Fixed-Grain Striping, the mixed workload the number of streams is maximized at Bf=327,680 across different number of disks and system load values.

Example of Variable Grain Striping

Figure 11:
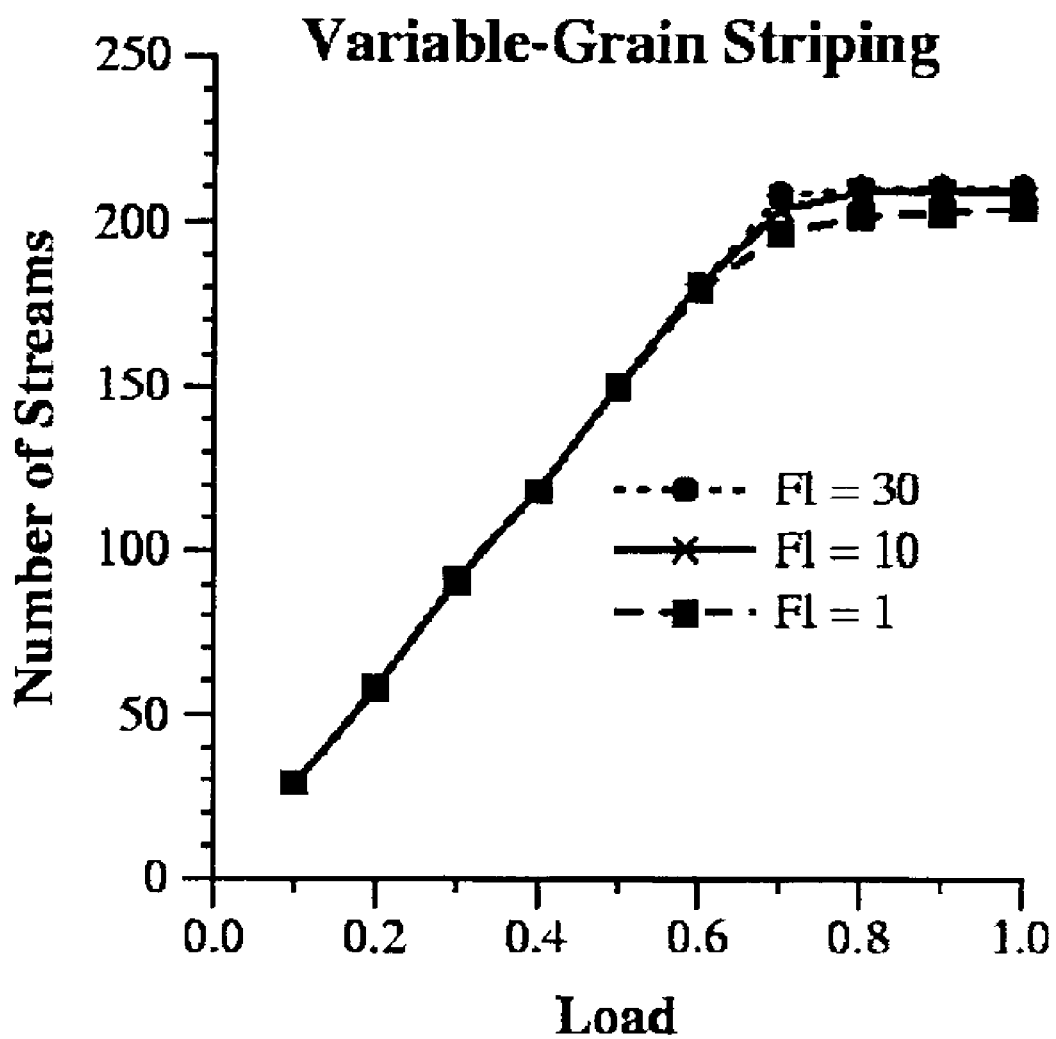
FIG. 11 is a graph of number of streams versus load under Variable Grain Striping.

Referring to FIG. 11, there is shown a graph of number of streams versus load under Variable Grain Striping. As shown, the performance of Variable-Grain Striping on sixteen disks is shown as the load increases from 10% to 100%. The number of streams grows linearly as the load increases up to 70%. This is significantly higher than the 50% load, where Fixed-Grain Striping flattened out (FIG. 5). As before, a lookahead factor value of Fl=1 attains more than 95% of the system throughput, and that is the value that is used.

Figure 12:
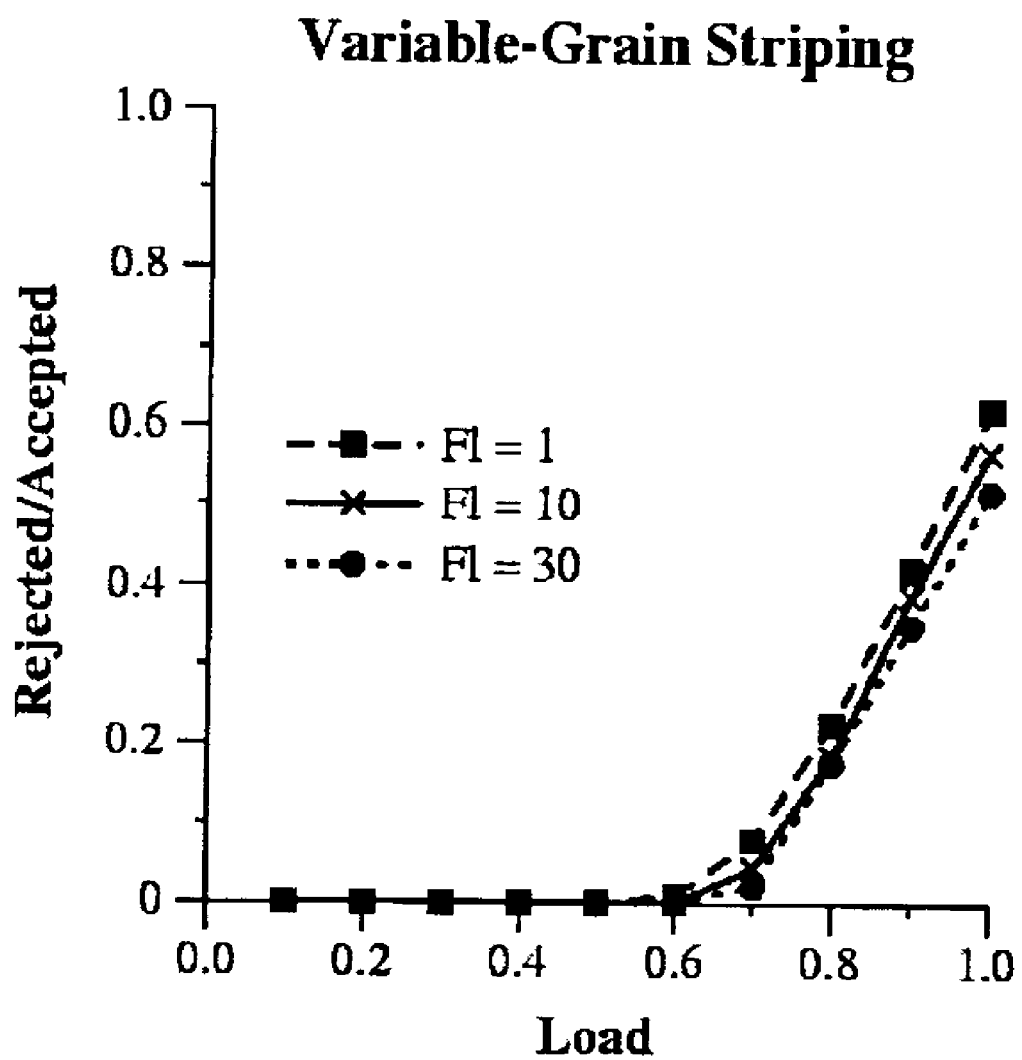
FIG. 12 is a graph of a ratio of total number of rejected streams over total number of accepted streams versus load under Variable Grain Striping.

Referring to FIG. 12, there is shown a graph of a ratio of total number of rejected streams over total number of accepted streams versus load under Variable Grain Striping. As shown, only loads higher than 70% with Variable Grain Striping increases the number of rejected streams.

Figure 13:
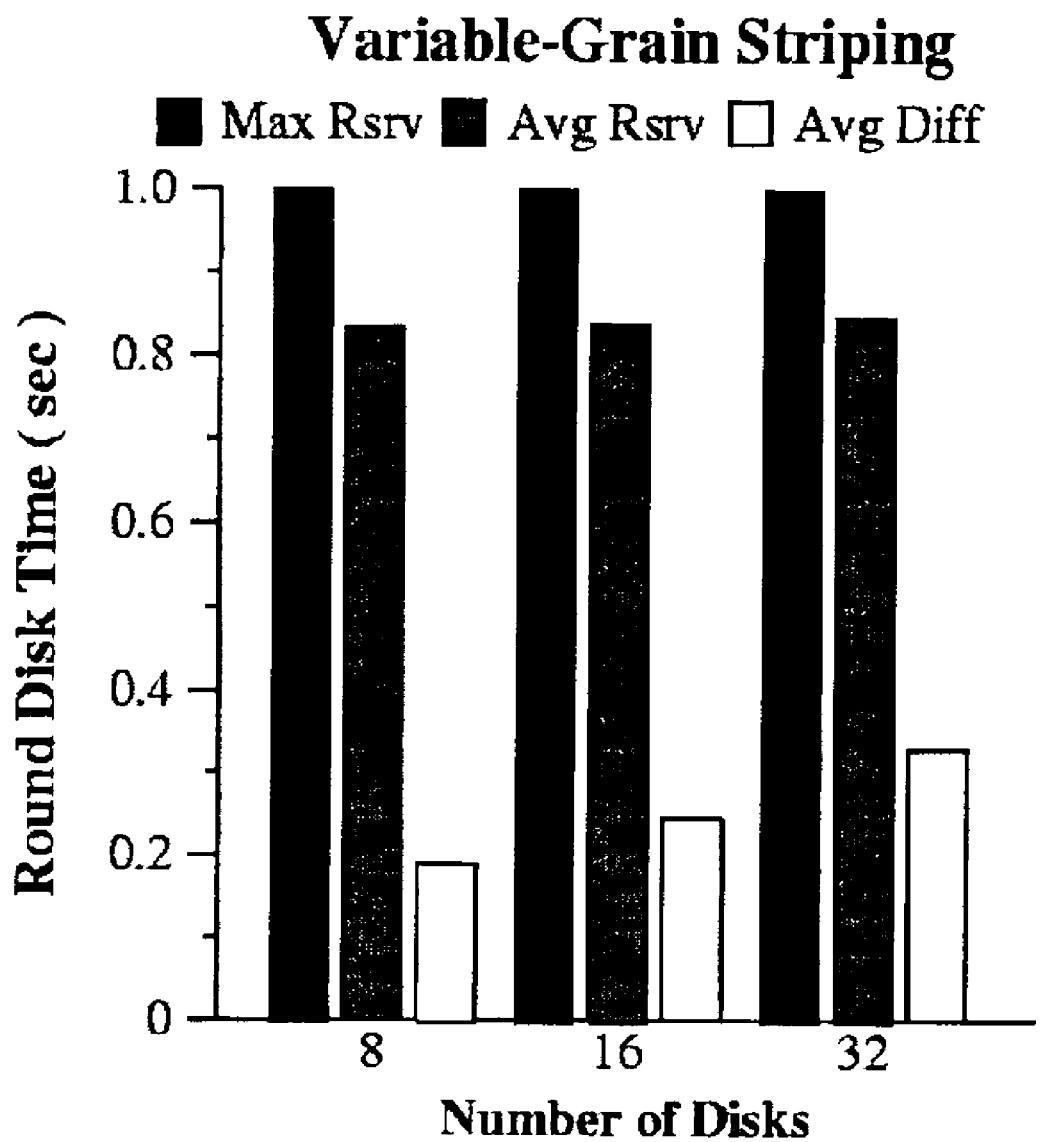
FIG. 13 is a graph of round disk access time versus number of disks under Variable Grain Striping.

Referring to FIG. 13, there is shown a graph of round disk access time versus number of disks under Variable Grain Striping. As the number of disks increases, the average reserved time increases from 83% with 8 disks, to 84% with 16 disks, and 85% with 32 disks. The maximum number of sustained streams with 4 to 64 disks was also measured. At a load of 80%, the number of streams increases from 48.11 with 4 disks, to 202.69 with 16 disks and 786.05 with 64 disks. Thus, as the number of disks increases, the number of streams remains within 3% of what perfectly linear scalability should achieve. In addition, the advantage of Variable-Grain Striping over Fixed-Grain Striping increases from 23% with 4 disks to 43% with 64 disks.

Figure 14:
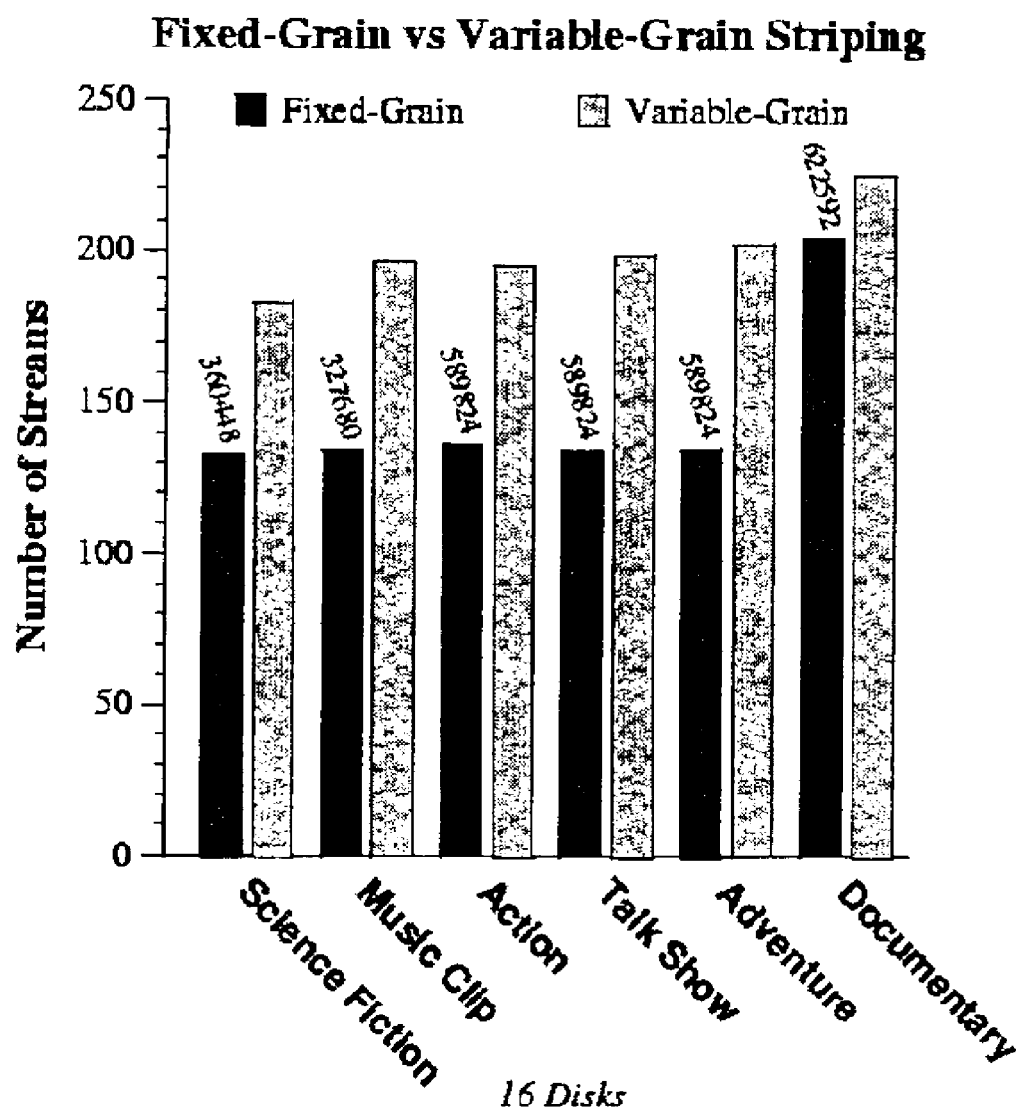
FIG. 14 is a graph of number of streams versus individual stream types in both Fixed-Grain versus Variable-Grain Striping.

Referring to FIG. 14, there is shown a graph of number of streams versus individual stream types in both Fixed-Grain versus Variable-Grain Striping. As the content type changes from Science Fiction to Documentary and the variation in data transfers correspondingly drops, the block size has to be larger in order to maximize the performance of Fixed-Grain Striping. However, the performance remains about the same for the five stream types, and increases only with the Documentary stream. In contrast, Variable-Grain Striping manages to transform even minor decreases in data transfer variation into improved performance. Overall, Variable-Grain Striping maintains an advantage over Fixed-Grain Striping between 11 % and 50%.

Validation is Simulated Disk Mode

In order to keep the computation time reasonable, the previous work were conducted with the system in Admission Control mode, where playback requests arrive leading to corresponding resource reservations, but without actual time measurement of the individual disk transfers. The statistics of the disk time resource reservations is compared with the statistics gathered over the access times of all individual data transfers involved, using the DiskSim representation of the Seagate Cheetah ST-34501 disk. A two-disk array model is used with each disk attached to a separate 20 MB/sec SCSI bus, and no contention assumed on the host system bus connecting the two SCSI buses. The statistics are gathered during 6,000 rounds after a warmup period of 3,000 rounds, as before. The mixed workload is used with average number of active streams 21.23 and 23.27 for Fixed-Grain and Variable-Grain Striping, respectively, corresponding to 80% load.

Figure 15:
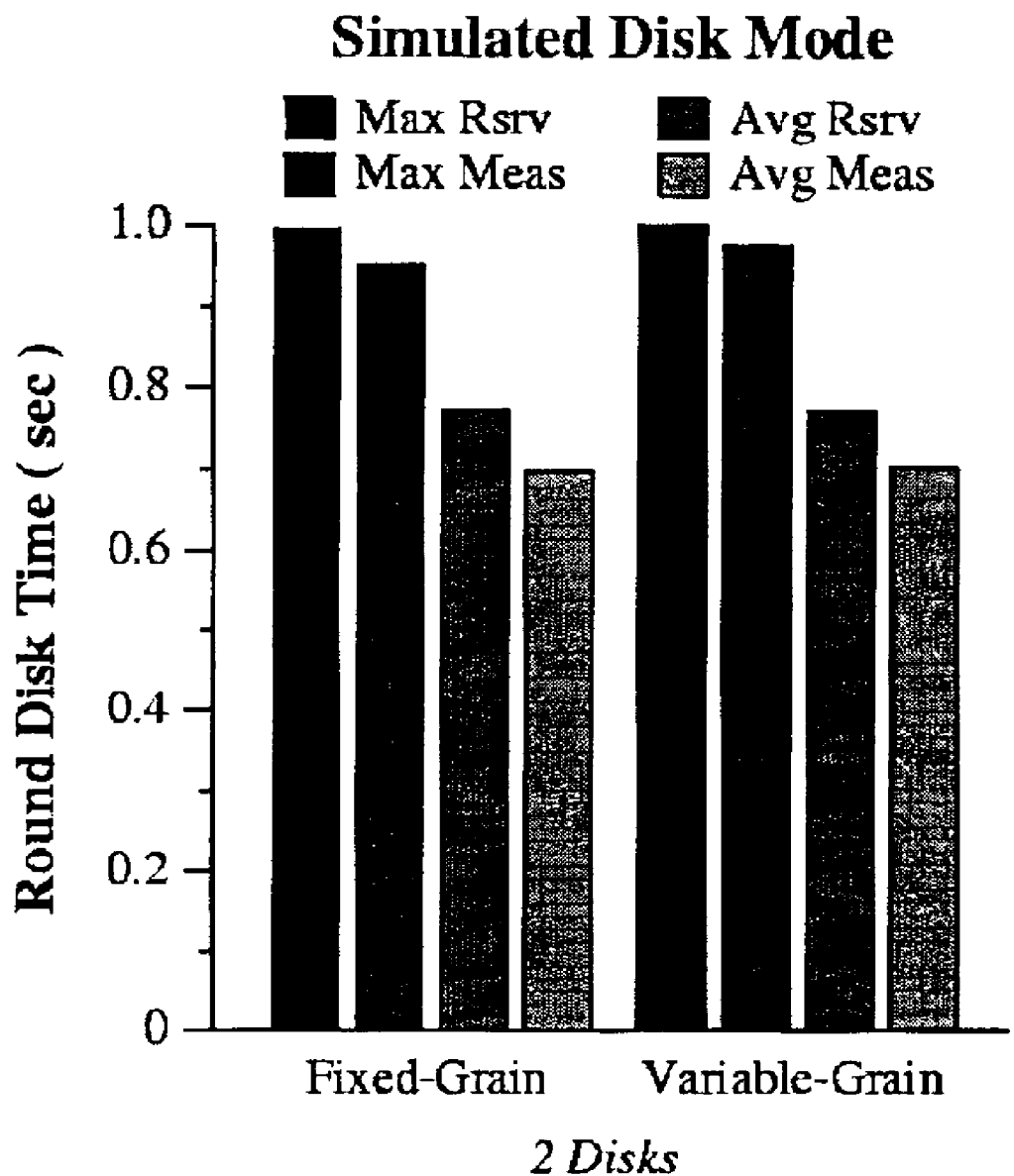
FIG. 15 is a graph of round disk time in Simulated Disk Mode.

Referring to FIG. 15, there is shown a graph of round disk time in Simulated Disk Mode. As can be seen from FIG. 15, in both the average and maximum case, the reserved disk time is no more than 8% higher than the corresponding measurements using the DiskSim. The difference can be attributed to the fact that the reservation assumes a minimum disk transfer rate and ignores on-disk caching.

Effect of Technology Improvements

To project disk technology improvements for the foreseeable future, the compound growth rates from the past are extended linearly into the future (Table 3). In particular, a 30% increase in internal disk transfer rate per year, and 23% decrease in seek distance is used. The full seek time depends linearly on seek distance, so the decrease is also 23%. However, a decrease of 12% per year for the track seek time is also assumed, which is dependent on the square root of the seek distance (among other factors more complex to project including settle time). Finally, a rotation speed increase of 12% per year is assumed. The stream types and sizes remaining the same.

TABLE 3

Projection of disk parameter changes in two and five years into the future.

| Disk Parameter | Today | 2 Years | 5 Years |
| --- | --- | --- | --- |
| Min Transfer Rate (MB/sec) | 11.3 | 19.10 | 41.92 |
| Max Seek Time (msec) | 18.2 | 10.74 | 4.91 |
| Track Seek Time (msec) | 0.98 | 0.76 | 0.51 |
| Avg Rotation Latency (msec) | 2.99 | 2.38 | 1.70 |

The above compared Fixed-Grain Striping to Variable-Grain Striping, which is a special case of Group-Grain Striping at G=1. With current disk technology, having G=1 maximizes the number of streams. But as the disk access time drops, it is beneficial to increase G, so that G rounds worth of stream data are transferred in a single round. Specifically, when using the mixed workload, it is anticipated that two years into the future, the number of streams that could be supported with Group-Grain policy at G=2 increases by 35% when compared to Fixed-Grain Striping. Five years into the future, the corresponding benefit of Group Grain Striping at G=3 remains at 29%. Thus, under reasonable technological improvements, there are significant performance improvements when using Group-Grain Striping instead of Fixed-Grain Striping.

Although preferred embodiments of the invention have been described herein, it will be understood by those skilled in the art that variations may be made thereto without departing from the scope of the invention. While this invention has focused on the striping problem for the common case of sequential playback of video, it will be understood by those skilled in the art that variations beyond the playback of video, such as, the download of a file or any other material or any stream data, may be made thereto without departing from the scope of the invention.

Although preferred embodiments of the invention have been described herein, it will be understood by those skilled in the art that variations may be made thereto without departing from the scope of the invention or the appended claims.

What is claimed is:

1. A method of storage device space management for storing stream data on storage devices of a streaming server where stream data transfers occur in rounds of fixed duration, comprising dividing the stream data into segments of stream data where each of the segments comprises an amount of stream data retrieved from the storage space of one storage device in response to one retrieval request;

allocating storage space of the storage devices in strides where each of the strides comprises a contiguous chunk of storage space and that each of the strides is sized for storing at least one segment; and storing the segments in the strides.

2. The method of claim 1, wherein the strides are of a predetermined fixed size.

3. The method of claim 1, wherein the strides are of variable sizes.

4. The method of claim 1, wherein stream data is stored on the disks using fixed-grain striping.

5. The method of claim 2, wherein stream data is stored on the disks using fixed-grain striping.

6. The method of claim 3, wherein stream data is stored on the storage devices using fixed-grain striping.

7. The method of claim 1, wherein stream data is stored on the storage devices using group-grain striping.

8. The method of claim 2, wherein stream data is stored on the storage devices using group-grain striping.

9. The method of claim 3, wherein stream data is stored on the storage devices using group-grain striping.

10. An array of storage devices for a streaming server having storage space management for storing stream data, where stream data transfers occur in rounds of fixed duration, the storage device space management comprising dividing the stream data into segments of stream data where each of the segments comprises an amount of stream data retrieved from the storage space of one storage device in response to one retrieval request;

allocating storage space of the storage devices in strides where each of the strides comprises a contiguous chunk of storage space and that each of the strides is sized for storing at least one segment; and storing the segments in the strides wherein at least one segment of stream data is retrieved for transfer during one of the rounds.

11. The storage device space management of claim 10, wherein the strides are of a predetermined fixed size.

12. The storage device space management of claim 10, wherein the strides are of variable sizes.

13. The storage device space management of claim 10, wherein stream data is stored on the storage devices using fixed-grain striping.

14. The storage device space management of claim 11, wherein stream data is stored on the storage devices using fixed-grain striping.

15. The storage device space management of claim 12, wherein stream data is stored on the storage devices using fixed-grain striping.

16. The storage device space management of claim 10, wherein stream data is stored on the storage devices using group-grain striping.

17. The storage device space management of claim 11, wherein stream data is stored on the storage devices using group-grain striping.

18. The storage device space management of claim 12, wherein stream data is stored on the storage devices using group-grain striping.

* * * * *